United States Patent
Seth et al.

(10) Patent No.: US 11,228,999 B2
(45) Date of Patent: Jan. 18, 2022

(54) SYSTEMS AND METHODS FOR COARSE AND FINE TIME OF FLIGHT ESTIMATES FOR PRECISE RADIO FREQUENCY LOCALIZATION IN THE PRESENCE OF MULTIPLE COMMUNICATION PATHS

(71) Applicant: Locix, Inc., San Bruno, CA (US)

(72) Inventors: Manu Seth, Berkeley, CA (US);
Lingkai Kong, Palo Alto, CA (US);
Tommi Ylamurto, Los Gatos, CA (US); Vivek Subramanian, Austin, TX (US)

(73) Assignee: LOCIX, INC., San Bruno, CA (US)

( * ) Notice: Subject to any disclaimer, the term of this patent is extended or adjusted under 35 U.S.C. 154(b) by 0 days.

(21) Appl. No.: 16/595,134

(22) Filed: Oct. 7, 2019

(65) Prior Publication Data
US 2020/0053691 A1     Feb. 13, 2020

Related U.S. Application Data

(60) Division of application No. 15/697,284, filed on Sep. 6, 2017, now Pat. No. 10,470,156, which is a
(Continued)

(51) Int. Cl.
*H04W 64/00*     (2009.01)
*H04L 12/26*     (2006.01)

(52) U.S. Cl.
CPC ....... *H04W 64/003* (2013.01); *H04L 43/0858* (2013.01); *H04L 43/0864* (2013.01)

(58) Field of Classification Search
CPC ... H04W 64/003; H04W 84/18; H04W 64/00; H04L 43/0858; H04L 43/0864; G01S 13/765; G01S 11/02; G01S 5/02
See application file for complete search history.

(56) References Cited

U.S. PATENT DOCUMENTS

| | | |
|---|---|---|
| 7,388,541 B1 | 6/2008 | Yang |
| 8,325,704 B1 | 12/2012 | Lemkin et al. |

(Continued)

FOREIGN PATENT DOCUMENTS

| | | |
|---|---|---|
| CN | 103852754 A | 6/2014 |
| CN | 104755954 A | 7/2015 |

(Continued)

OTHER PUBLICATIONS

Xu, Yurong et al., "Mobile Anchor-free Localization for Wireless Sensor Networks", Computer Science Department, Dartmouth College, Department of Computer Science and Engineering, University of Texas Arlington, 13 pages.
(Continued)

*Primary Examiner* — Hashim S Bhatti
(74) *Attorney, Agent, or Firm* — Jaffery Watson Mendonsa & Hamilton LLP

(57) ABSTRACT

Systems and methods for determining locations of wireless nodes in a network architecture are disclosed herein. In one example, a method comprises initiating calibration, with processing logic, of at least one component of RF circuitry having a transmit chain and a receive chain of a first wireless node by generating a first loopback calibration signal and passing this first loopback calibration signal through the transmit chain and the receive chain of the first wireless node. The method further includes measuring a first transmit time delay for passing the first loopback calibration signal through the transmit chain and also measuring a first receive time delay for passing the first loopback calibration signal through the receive chain of the first wireless node.

26 Claims, 15 Drawing Sheets

Related U.S. Application Data continuation-in-part of application No. 15/173,531, filed on Jun. 3, 2016, now Pat. No. 10,757,675.

(56) References Cited

U.S. PATENT DOCUMENTS

| | | | |
|---|---|---|---|
| 9,304,186 | B2 | 4/2016 | Amizur |
| 2002/0118723 | A1 | 8/2002 | McCrady et al. |
| 2004/0004905 | A1 | 1/2004 | Lyon et al. |
| 2005/0020279 | A1 | 1/2005 | Markhovsky et al. |
| 2006/0104387 | A1 | 5/2006 | Sahinoglu et al. |
| 2007/0200759 | A1 | 8/2007 | Heidari-Bateni et al. |
| 2008/0014626 | A1 | 1/2008 | Pohlscheidt et al. |
| 2008/0146262 | A1 | 6/2008 | Schwoerer et al. |
| 2008/0293360 | A1 | 11/2008 | Maslennikov et al. |
| 2009/0073031 | A1 | 3/2009 | Kim |
| 2010/0008407 | A1 | 1/2010 | Izumi et al. |
| 2010/0239042 | A1 | 9/2010 | Hamalainen et al. |
| 2011/0119024 | A1 | 5/2011 | Nam et al. |
| 2011/0208481 | A1 | 8/2011 | Slastion |
| 2012/0032855 | A1 | 2/2012 | Reede et al. |
| 2012/0036198 | A1 | 2/2012 | Marzencki et al. |
| 2013/0138314 | A1 | 5/2013 | Viittala et al. |
| 2013/0273935 | A1 | 10/2013 | Amizur |
| 2014/0136093 | A1 | 5/2014 | Banin et al. |
| 2014/0341023 | A1 | 11/2014 | Kim et al. |
| 2015/0063138 | A1 | 3/2015 | Aldana |
| 2015/0168536 | A1 | 6/2015 | Banin |
| 2015/0168537 | A1 | 6/2015 | Amizur et al. |
| 2015/0270882 | A1* | 9/2015 | Shattil .................. H04B 7/0452 370/329 |
| 2015/0358938 | A1 | 12/2015 | Richley et al. |
| 2016/0164760 | A1 | 6/2016 | Wakabayashi et al. |
| 2016/0195600 | A1 | 7/2016 | Feldman et al. |
| 2016/0204822 | A1 | 7/2016 | Yu et al. |
| 2016/0234008 | A1 | 8/2016 | Hekstra et al. |
| 2016/0363648 | A1 | 12/2016 | Mindell et al. |
| 2017/0048671 | A1 | 2/2017 | Marri Sridhar |
| 2017/0055131 | A1 | 2/2017 | Kong et al. |
| 2017/0059701 | A1* | 3/2017 | Oh .......................... G01S 13/74 |
| 2017/0168135 | A1 | 6/2017 | Want et al. |
| 2017/0188192 | A1 | 6/2017 | Mujtaba et al. |
| 2018/0143285 | A1 | 5/2018 | Sen et al. |

FOREIGN PATENT DOCUMENTS

| | | | |
|---|---|---|---|
| EP | 1425867 | B1 | 4/2005 |
| EP | 3047296 | A1 | 7/2016 |
| EP | 2847611 | B1 | 11/2018 |
| EP | 3466165 | | 4/2019 |
| JP | 2016011433 | A | 1/2016 |
| JP | 2016514250 | A | 5/2016 |
| WO | 3110154 | A1 | 2/2001 |
| WO | 2006015265 | A2 | 2/2006 |
| WO | 2007067821 | A2 | 6/2007 |
| WO | 2013166546 | A1 | 11/2013 |
| WO | 2015-099925 | A1 | 7/2015 |
| WO | 2015-134270 | A1 | 9/2015 |
| WO | 2016011433 | A3 | 3/2016 |
| WO | 2017210359 | A1 | 5/2017 |
| WO | 2019040556 | A1 | 2/2019 |
| WO | 2019051040 | A2 | 3/2019 |

OTHER PUBLICATIONS

Wang, Yue, "Linear least squares localization in sensor networks", EURASIP Journal on Wireless Communications and Networking, 7 pages, (2015).

Shang, Yi et al., "Improved MDS-Based Localization", IEEE Infocom 2004, 12 pages.

Chan, Y.T. et al., "A Simple and Efficient Estimator for Hyperbolic Location", IEEE Transactions on Signal Processing, vol. 42, No. 8, Aug. 1994, pp. 1905-1915.

Simonetto, Andrea et al., "Distributed Maximum Likelihood Sensor Network Localization", IEEE Transactions on Signals Processing, vol. 62, No. 6, Mar. 15, 2014, pp. 1424-1437.

Isokawa, Teijiro et al., "An Anchor-Free Localization Scheme with Kalman Filtering in ZigBee Sensor Network", Hindawa, ISRN Sensor Networks, vol. 2013, Article ID 356231, 11 pages, http:dx. doi.org/10.1155/2013/356231.

Priyantha, Nissanka B., et al., "Anchor-Free Distributed Localization in Sensor Networks", Tech Report #892, Apr. 15, 2003, MIT Laboratory for Computer Science, 13 pages, http://nms.lcs.mit.edu/cricket/.

Youssef, Adel et al., "Accurate Anchor-free Node Localization in Wireless Sensor Networks", Baltimore, Maryland, 14 pages.

Giustiniano, Domenico et al., CAESAR: Carrier Sense-Based Ranging in Off-The-Shelf 802.11 Wireless LAN, Disney Research Zurich, Switzerland, 12 pages.

Vasisht, Deepak, et al., "Decimeter-Level Localization with a Single WiFi Access Point", USENIX, The Advanced Computing Systems Associations, https://www.usenix.org/conference/nsdi16/technical-sessions/presentation/vasisht, Mar. 16-18, 2016, 15 pages.

Wibowo, Sigit et al., "Time of Flight Ranging using Off-the-shelf IEEE802.11 WiFi Tags", Centre for Adaptive Wireless Systems, Department of Electronic Engineering, Cork Institute of Technology, Bishoptown, Cork, Ireland, 5 pages.

Xie, Yaxiong et al., "Precise Power Delay Profiling with Commodity WiFi", School of Computer Engineering, Nanyan Technological University, Singapore, 12 pages, 2015.

Mariakakis, Alex et al., "SAIL: Single Access Point-Based Indoor Localization", 14 pages, 2014.

Kotaru, Manikanta et al., "SpotFi: Decimeter Level Localization Using WiFi", Stanford University, pp. 269-282, 2015.

Vasisht, Deepak et al., "Sub-Nanosecond Time of Flight on Commercial Wi-Fi Cards", Massachusetts Institute of Technology, 14 pages, 2015.

Sarkar Tapan K. et al., "Using the Matrix Pencil Method to Estimate the Parameters of a Sum of Complex Exponentials", IEEE Antennas and Propagation Magazine, vol. 37, No. 1, Feb. 1995.

PCT Search Report for Application No. PCT/US2017/035307, dated Sep. 6, 2017 3 pages.

PCT Written Opinion of the International Searching Authority for Application No. PCT/US2017/035307, dated Sep. 6, 2017, 7 pages.

Restriction Requirement for U.S. Appl. No. 15/173,531, dated Apr. 10, 2018, 6 pages.

Non-Final Office Action for U.S. Appl. No. 15,173,531, dated Sep. 6, 2018, 14 pages.

International Preliminary Report for Application No. PCT/US2017/035307, dated Dec. 13, 2018, 9 pages.

International Search Report for PCT Application No. PCT/US2018/049683, dated Mar. 4, 2019, 20 pages.

Office Action for U.S. Appl. No. 115/173,531, dated Mar. 18, 2019, 14 pages.

Notification of Publication for CN Application No. 2017800345206, Published on Apr. 2, 2019 as CN109565767A, 4 pages.

Notice of Allowance received for U.S. Appl. No. 15/697,284, dated Jul. 18, 2019, 7 pages.

Notice of Publication of CN Application No. 201800577373, dated Apr. 21, 2020, 4 pages.

International Preliminary Report for PCT Application No. PCT/US2018/049683, 14 pages, dated Mar. 19, 2020.

Notice of Allowance for U.S. Appl. No. 15/173,531, dated Mar. 31, 2020, 9 pages.

Notice of Publication of EP Application No. 18853876.3, Publication No. 3679750, dated Jul. 15, 2020, 1 pages.

Advisory Action, U.S. Appl. No. 15/173,531, dated Jan. 13, 2020, 3 pages, USPTO.

Corrected Notice of Allowance, U.S. Appl. No. 15/173,531, dated Jul. 23, 2020, 8 pages, USPTO.

Extended European Search Report, EP Application No. 17807439.9, dated May 20, 2020, 19 pages, EPO.

Extended European Search Report, EP Application No. 18853876.3, dated May 3, 2021, 11 pages, EPO.

Final Office Action, U.S. Appl. No. 15/173,531, dated Sep. 30, 2019, 9 pages, USPTO.

(56) References Cited

OTHER PUBLICATIONS

Non-Final Office Action, U.S. Appl. No. 15/697,284, dated Feb. 26, 2019, 14 pages, USPTO.
Notice of Allowance, U.S. Appl. No. 15/697,284, dated Jul. 18, 2019, 7 pages, USPTO.
O. Bialer et al., "Location Estimation In Multipath Environments With Unsynchronized Base Stations," 2016, 5 pages, IEEE.
Office Action, JP Application No. 2018-562985, dated Mar. 23, 2021, 7 pages, (Incl. English Translation), JPO.
Restriction Requirement, U.S. Appl. No. 15/697,284, dated Dec. 12, 2018, 5 pages, USPTO.
Restriction Requirement, U.S. Appl. No. 16/894,023, Jun. 15, 2021, 6 pages, USPTO.
Staudinger et al., "Round-Trip Delay Ranging with OFDM Signals—Performance Evaluation with Outdoor Experimentation," 2014, 7 pages, IEEE.
Supplementary European Search Report, EP Application No. 17807439.9, dated Jan. 13, 2020, 14 pages, EPO.
Xiong Cai et al., "Identification and Mitigation of NLOS Based on Channel State Information for Indoor WiFi Localization," 2015, 5 pages, IEEE.
Yi Jiang and Victor C.M. Leung, "An Asymmetric Double Sided Two-Way Ranging for Crystal Offset," 2007, pp. 525-528, IEEE.
First Office Action, CN Application No. 2018800577373, dated Nov. 3, 2021, 8 pages. SIPO.
Non-Final Office Action, U.S. Appl. No. 16/894,023, dated Nov. 9, 2021, 26 pages. USPTO.

* cited by examiner

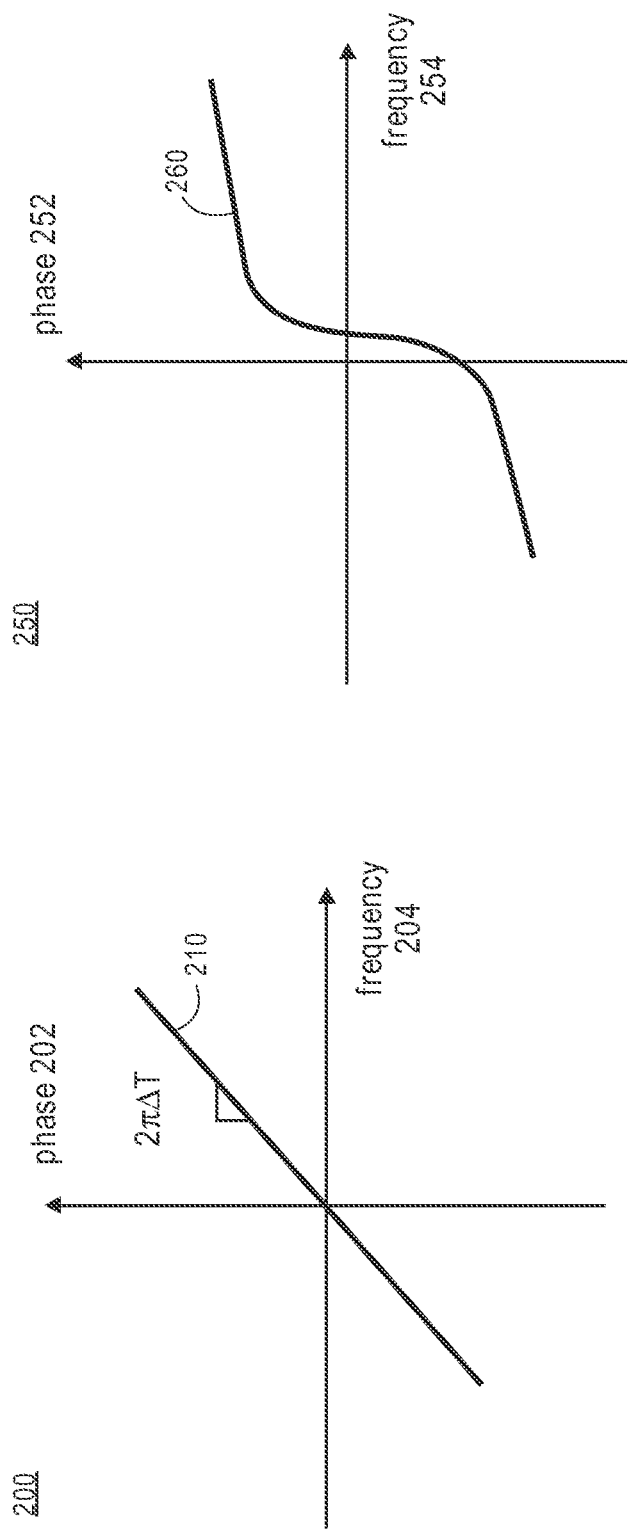

CALIBRATE, WITH THE PROCESSING LOGIC, AT LEAST ONE COMPONENT (E.G., AUTOMATIC GAIN CONTROL (AGC) STAGE OF THE RF CIRCUITRY, FILTER STAGE OF THE RF CIRCUITRY, ETC.) THAT HAS A DELAY WITH THE CALIBRATION OF AT LEAST ONE COMPONENT INCLUDING MEASURING A DELAY OF THE AT LEAST ONE COMPONENT (E.G., AGC STAGE AS A FUNCTION OF GAIN, FILTER STAGE) DETERMINING IF A DEVIATION EXISTS BETWEEN THE MEASURED DELAY AND A BASELINE DELAY OF THE AT LEAST ONE COMPONENT, AND CORRECTING A TIMING OF THE DETERMINED TIME OF FLIGHT ESTIMATE IF A DEVIATION EXISTS.
1201

---

TRANSMIT, WITH THE HUB (OR ANCHOR NODE, WIRELESS DEVICE, REMOTE DEVICE OR COMPUTER) HAVING RADIO FREQUENCY (RF) CIRCUITRY AND AT LEAST ONE ANTENNA, COMMUNICATIONS TO A PLURALITY OF SENSOR NODES IN THE WIRELESS NETWORK ARCHITECTURE (E.G., WIRELESS ASYMMETRIC NETWORK ARCHITECTURE).
1202

---

RECEIVE, WITH THE RF CIRCUITRY AND AT LEAST ONE ANTENNA OF THE HUB (OR ANCHOR NODE, WIRELESS DEVICE, REMOTE DEVICE OR COMPUTER), COMMUNICATIONS FROM THE PLURALITY OF SENSOR NODES EACH HAVING A WIRELESS DEVICE WITH A TRANSMITTER AND A RECEIVER TO ENABLE BI-DIRECTIONAL COMMUNICATIONS WITH THE RF CIRCUITRY OF THE HUB IN THE WIRELESS NETWORK ARCHITECTURE.
1203

---

INITIALLY CAUSE, WITH THE PROCESSING LOGIC OF A HUB (OR ANCHOR NODE, WIRELESS DEVICE, REMOTE DEVICE OR COMPUTER) HAVING A WIRELESS CONTROL DEVICE, A WIRELESS NETWORK OF SENSOR NODES TO BE CONFIGURED AS A MESH-BASED NETWORK ARCHITECTURE FOR A TIME PERIOD (E.G., PREDETERMINED TIME PERIOD, TIME PERIOD SUFFICIENT FOR LOCALIZATION, ETC.).
1205

---

DETERMINE, WITH THE PROCESSING LOGIC OF THE HUB (OR ANCHOR NODE, WIRELESS DEVICE, REMOTE DEVICE OR COMPUTER), LOCALIZATION OF AT LEAST TWO NODES (OR ALL NODES) USING AT LEAST ONE TIME OF FLIGHT TECHNIQUE AND POSSIBLY A SIGNAL STRENGTH TECHNIQUE.
1206

---

UPON LOCALIZATION OF THE AT LEAST TWO NETWORK SENSOR NODES BEING COMPLETE, THE PROCESSING LOGIC OF THE HUB (OR ANCHOR NODE, WIRELESS DEVICE, REMOTE DEVICE OR COMPUTER) TERMINATES TIME OF FLIGHT MEASUREMENTS IF ANY TIME OF FLIGHT MEASUREMENTS ARE OCCURRING AND CONTINUES MONITORING THE SIGNAL STRENGTH OF COMMUNICATIONS WITH THE AT LEAST TWO NODES.
1208

---

CONFIGURE THE WIRELESS NETWORK IN A TREE BASED OR TREE-LIKE NETWORK ARCHITECTURE (OR TREE ARCHITECTURE WITH NO MESH-BASED FEATURES) UPON COMPLETION OF LOCALIZATION.
1210

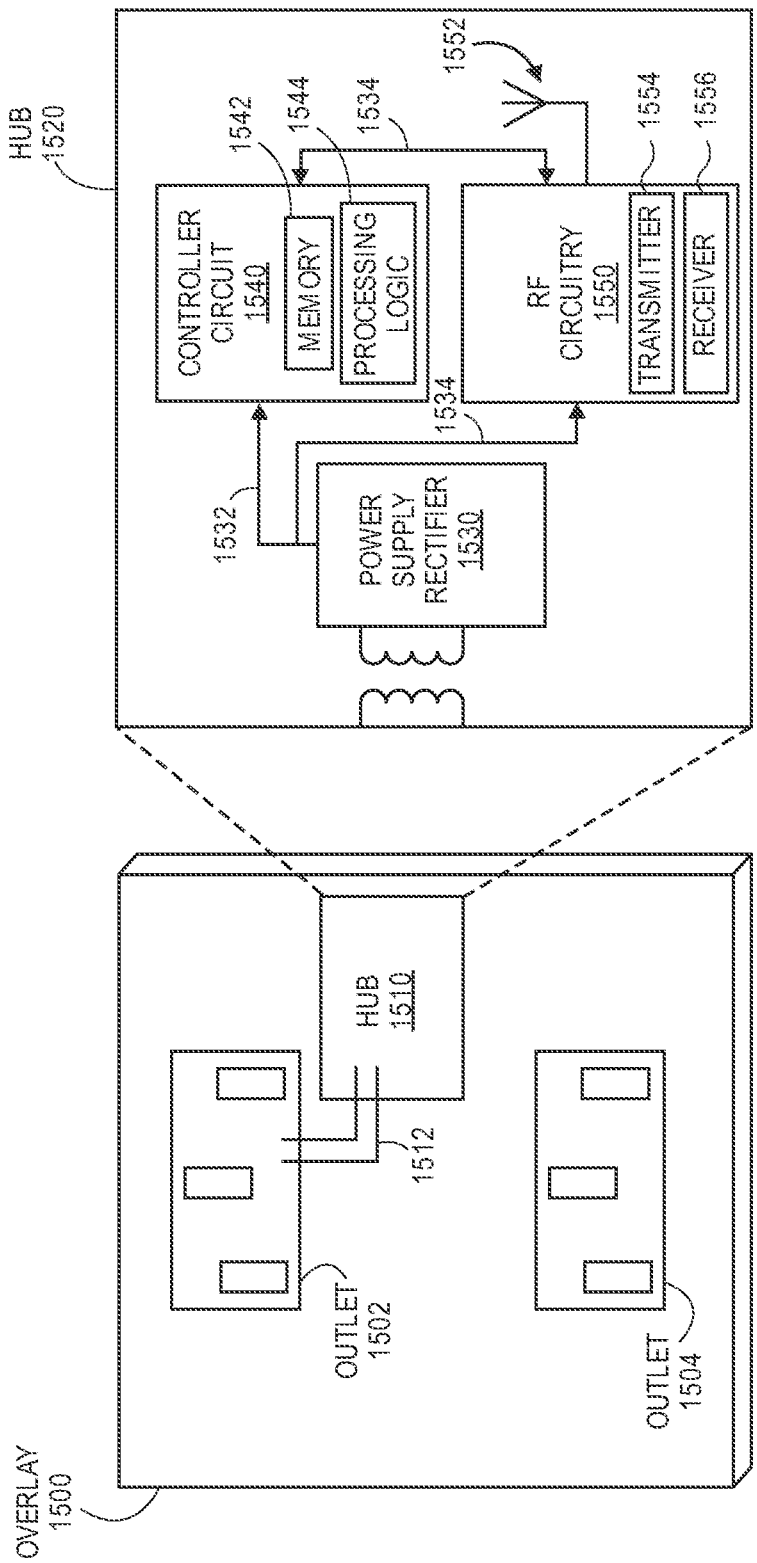

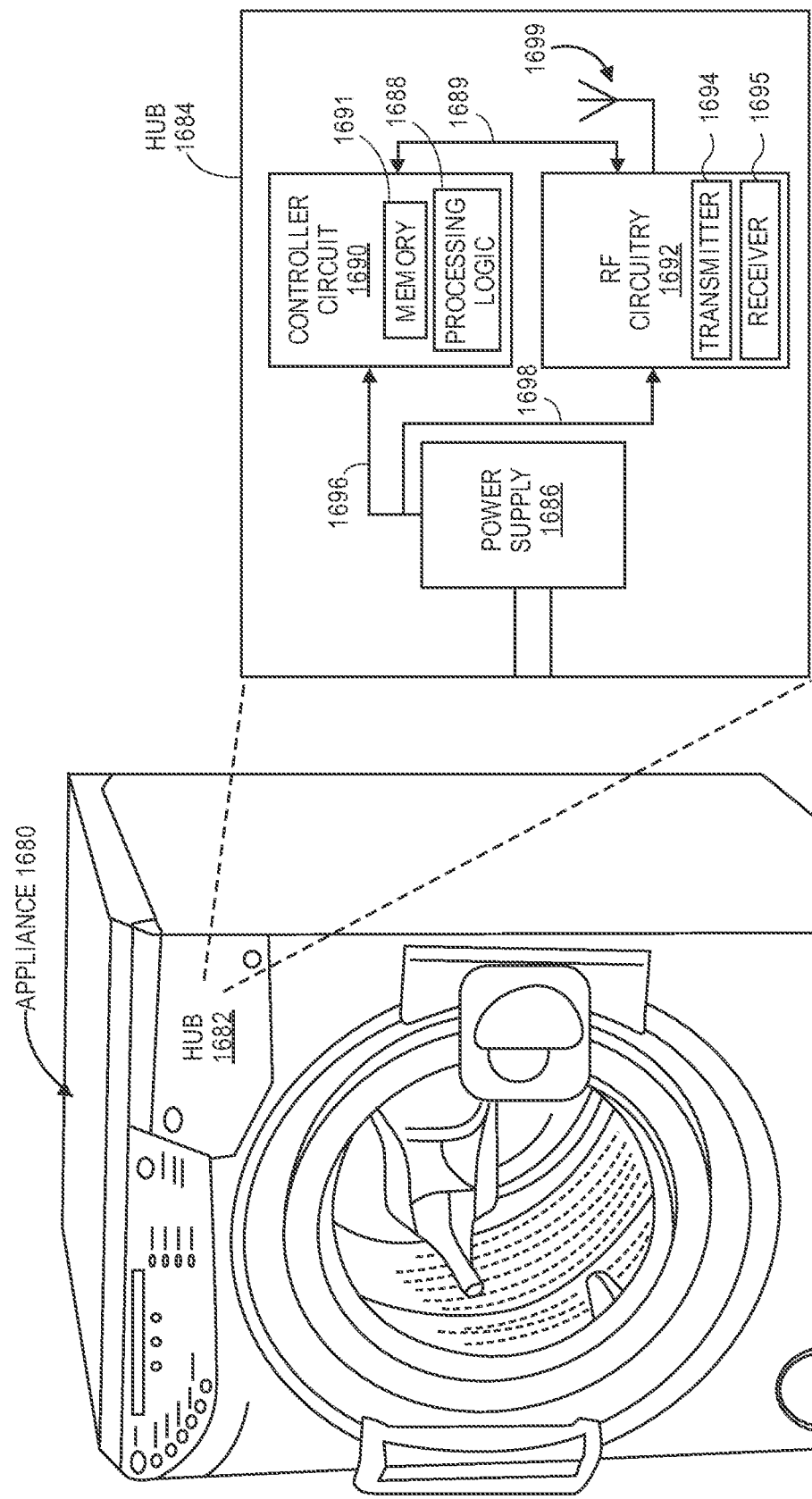

SYSTEMS AND METHODS FOR COARSE AND FINE TIME OF FLIGHT ESTIMATES FOR PRECISE RADIO FREQUENCY LOCALIZATION IN THE PRESENCE OF MULTIPLE COMMUNICATION PATHS

RELATED APPLICATIONS

This application is a divisional of U.S. application Ser. No. 15/697,284, filed Sep. 6, 2017, which is a continuation-in-part of U.S. application Ser. No. 15/173,531, filed on Jun. 3, 2016, the entire contents of which are hereby incorporated by reference.

FIELD

Embodiments of the invention pertain to systems and methods for coarse and fine time of flight estimates for precise radio frequency localization in the presence of multiple communication paths.

BACKGROUND

In the consumer electronics and computer industries, wireless sensor networks have been studied for many years. In archetypal wireless sensor networks, one or more sensors are implemented in conjunction with a radio to enable wireless collection of data from one or more sensor nodes deployed within a network. Each sensor node may include one or more sensors, and will include a radio and a power source for powering the operation of the sensor node. Location detection of nodes in indoor wireless networks is useful and important in many applications.

Localization based on triangulation performed using radio frequency measurements is an attractive method for determining location of wirelessly equipped objects in three dimensional space. RF-based localization may be performed in numerous ways. Distances between multiple object pairs must be determined to enable calculation of relative positions in three dimensional space via triangulation based on the individual pair distances. An exemplary implementation includes a hub and multiple sensor nodes. Note that the hub may be replaced with a node, or indeed, one or more of the nodes may be replaced with a hub. Distances are estimated using radio frequency techniques between all the individual pairs via RF communications. Once the distance is estimated, triangulation may be used to determine the relative position in three dimensional space of each object. If the position of at least 2 of the objects is known in real space, then the absolute position of each object in the network may be determined. Indeed, if the position of 1 object (e.g., the hub) is known within the network, along with the angular path to at least one other node, then again the absolute position of each object within the network may be determined.

Distance measurement between object pairs is therefore a key step in RF-based localization. Distance estimation may be performed in numerous ways. Signal strength of communication (RSSI) may be measured between pairs and used to estimate distance based on known models of signal attenuation. Time of Flight (TOF) may be measured for signals transmitted between objects and distance may be estimated based on known propagation delay models. Angle of arrival (AOA) may additionally be estimated based on resolution of angular variation in signal strength. Of these, RSSI is often prone to error due to variations in attenuation, and is therefore less attractive than TOF for distance estimation.

TOF based distance estimation is susceptible to error due to reflections causing the presence of multiple paths between two objects. In this situation, the estimated path may be detected as being longer than the real path due to the reflected path being longer than the direct path. If the system estimates the TOF based on the reflected path, then errors are introduced in triangulation.

SUMMARY

For one embodiment of the present invention, systems and methods for determining locations of wireless sensor nodes in a network architecture are disclosed herein. In one example, an asynchronous system for localization of nodes in a wireless network architecture includes a first wireless node having a wireless device with one or more processing units and RF circuitry for transmitting and receiving communications in the wireless network architecture including a first RF signal having a first packet. The system also includes a second wireless node having a wireless device with a transmitter and a receiver to enable bi-directional communications with the first wireless node in the wireless network architecture including a second RF signal with a second packet. The one or more processing units of the first wireless node are configured to execute instructions to determine a coarse time of flight estimate of the first and second packets and a fine time estimate of the time of flight using channel information of the first and second wireless nodes.

In another example, a synchronous system for localization of nodes in a wireless network architecture includes a first wireless node having a wireless device with one or more processing units and RF circuitry for transmitting and receiving communications in the wireless network architecture including a first RF signal having a first packet. A second wireless node having a wireless device with one or more processing units and RF circuitry to enable bi-directional communications with the first wireless node in the wireless network architecture includes a second RF signal having a second packet. The one or more processing units of the first wireless node are configured to execute instructions to determine a coarse time of flight estimate of the first and second packets and a fine time estimate of the time of flight using channel information of the first and second wireless nodes. In one example, the first and second wireless nodes have the same reference clock signal. Other features and advantages of embodiments of the present invention will be apparent from the accompanying drawings and from the detailed description that follows below.

BRIEF DESCRIPTION OF THE DRAWINGS

Embodiments of the present invention are illustrated by way of example and not limitation in the figures of the accompanying drawings, in which like references indicate similar elements, and in which:

FIG. 7A illustrates a phase response of an ideal channel in accordance with one embodiment.

FIG. 7B illustrates a phase response of a non-ideal channel in accordance with one embodiment.

FIG. 12 illustrates a method for determining location estimation of nodes using time of flight techniques in accordance with one embodiment.

FIG. 13A shows an exemplary embodiment of a hub implemented as an overlay 1500 for an electrical power outlet in accordance with one embodiment.

FIG. 13B shows an exemplary embodiment of an exploded view of a block diagram of a hub implemented as an overlay for an electrical power outlet in accordance with one embodiment.

FIG. 14C shows an exemplary embodiment of a hub implemented within an appliance (e.g., smart washing machine, smart refrigerator, smart thermostat, other smart appliances, etc.) in accordance with one embodiment.

FIG. 14D shows an exemplary embodiment of an exploded view of a block diagram of a hub 1684 implemented within an appliance (e.g., smart washing machine, smart refrigerator, smart thermostat, other smart appliances, etc.) in accordance with one embodiment.

DETAILED DESCRIPTION

Figure 1:
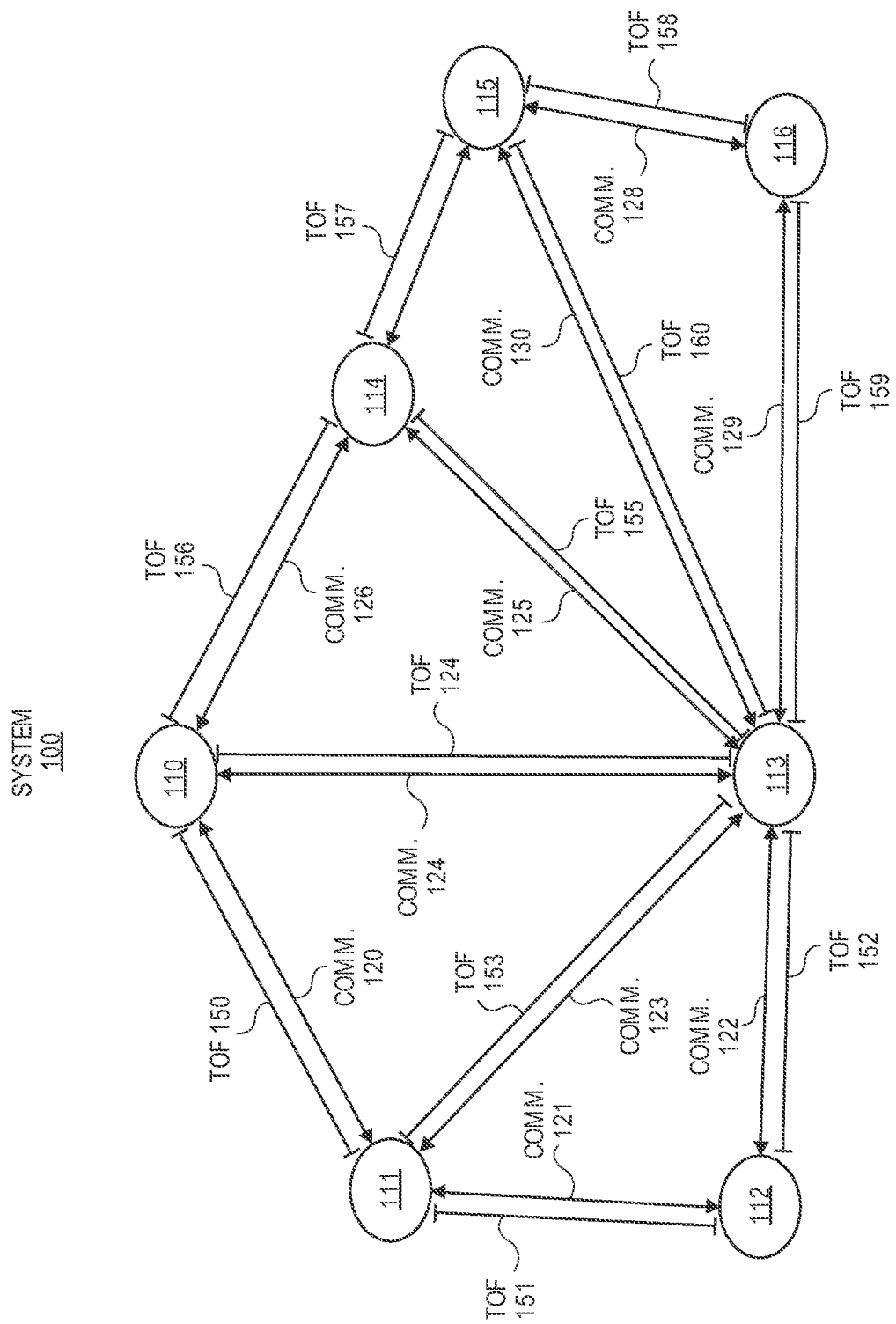
FIG. 1 illustrates an exemplar system of wireless nodes in accordance with one embodiment.

Systems and methods for precise radio frequency localization in the presence of multiple communication paths are disclosed herein. In one example, an asynchronous system for localization of nodes in a wireless network architecture includes a first wireless node having a wireless device with one or more processing units and RF circuitry for transmitting and receiving communications in the wireless network architecture including a first RF signal having a first packet. The system also includes a second wireless node having a wireless device with a transmitter and a receiver to enable bi-directional communications with the first wireless node in the wireless network architecture including a second RF signal with a second packet. The one or more processing units of the first wireless node are configured to execute instructions to determine a coarse time of flight estimate of the first and second packets and a fine time estimate of the time of flight using channel information of the first and second wireless nodes.

In various applications of wireless sensor networks, it may be desirable to determine the location of sensor nodes within the network. For example, such information may be used to estimate the relative position of sensors such as security cameras, motion sensors, temperature sensors, and other such sensors as would be apparent to one of skill in the art. This information may then be used to produce augmented information such as maps of temperature, motion paths, and multi-view image captures. Therefore, localization systems and methods are desired to enable accurate, low-power, and context-aware localization of nodes in wireless networks, particularly in indoor environments. For the purpose of this, indoor environments are also assumed to include near-indoor environments such as in the region around building and other structures, where similar issues (e.g., presence of nearby walls, etc.) may be present.

A wireless sensor network is described for use in an indoor environment including homes, apartments, office and commercial buildings, and nearby exterior locations such as parking lots, walkways, and gardens. The wireless sensor network may also be used in any type of building, structure, enclosure, vehicle, boat, etc. having a power source. The sensor system provides good battery life for sensor nodes while maintaining long communication distances.

Embodiments of the invention provide systems, apparatuses, and methods for localization detection in indoor environments. U.S. patent application Ser. No. 14/830,668 filed on Aug. 19, 2015, which is incorporated by reference herein, discloses techniques for RF-based localization. Specifically, the systems, apparatuses, and methods implement localization in a wireless sensor network that primarily uses a tree network structure for communication with periodic mesh-based features for path length estimation when localization is needed. The wireless sensor network has improved accuracy of localization while simultaneously providing good quality of indoor communication by using high-frequencies for localization and lower frequencies for communication.

Tree-like wireless sensor networks are attractive for many applications due to their reduced power requirements associated with the radio signal reception functionality. An exemplar tree-like network architecture has been described in U.S. patent application Ser. No. 14/607,045 filed on Jan. 29, 2015, U.S. patent application Ser. No. 14/607,047 filed on Jan. 29, 2015, U.S. patent application Ser. No. 14/607,048 filed on Jan. 29, 2015, and U.S. patent application Ser. No. 14/607,050 filed on Jan. 29, 2015, which are incorporated by reference in entirety herein.

Another type of wireless network that is often used is a mesh network. In this network, communication occurs between one or more neighbors, and information may then be passed along the network using a multi-hop architecture. This may be used to reduce transmit power requirements, since information is sent over shorter distances. On the other hand, receive radio power requirements may increase, since it is necessary for the receive radios to be on frequently to enable the multi-hop communication scheme.

Based on using the time of flight of signals between nodes in a wireless network, it is possible to estimate distance between individual pairs of nodes in a wireless network by exploiting the fact that the speed of signal propagation is relatively constant. Embodiments of the present network architecture allow measuring multiple pairs of path lengths and performing triangulation and then estimating the relative location of individual nodes in three-dimensional space.

FIG. 1 illustrates an exemplar system of wireless nodes in accordance with one embodiment. This exemplar system 100 includes wireless nodes 110-116. The nodes communicate bi-directionally with communications 120-130 (e.g., node identification information, sensor data, node status information, synchronization information, localization information, other such information for the wireless sensor network, time of flight (TOF) communications, etc.). Based on using time of flight measurements, path lengths between individual pairs of nodes can be estimated. An individual time of flight measurement between nodes 110 and 111 for example, can be achieved by sending a signal at a known time from node 110 to node 111. Node 111 receives the signal, records a time stamp of reception of the signal of the communications 120, and can then, for example, send a return signal back to A, with a time stamp of transmission of the return signal. Node 110 receives the signal and records a time stamp of reception. Based on these two transmit and receive time stamps, an average time of flight between nodes 110 and 111 can be estimated. This process can be repeated multiple times and at multiple frequencies to improve precision and to eliminate or reduce degradation due to poor channel quality at a specific frequency. A set of path lengths can be estimated by repeating this process for various node pairs. For example, in FIG. 1, the path lengths are TOF 150-160. Then, by using a geometric model, the relative position of individual nodes can be estimated based on a triangulation-like process.

This triangulation process is not feasible in a tree-like network, since only path lengths between any node and a hub can be measured. This then limits localization capability of a tree network. To preserve the energy benefits of a tree network while allowing localization, in one embodiment of this invention, a tree network for communication is combined with mesh-like network functionality for localization. Once localization is complete with mesh-like network functionality, the network switches back to tree-like communication and only time of flights between the nodes and the hub are measured periodically. Provided these time of flights are held relatively constant, the network then assumes nodes have not moved and does not waste energy is attempting to re-run mesh-based localization. On the other hand, when a change in path length in the tree network is detected, the network switches to a mesh-based system and re-triangulates to determine location of each node in the network.

Figure 2:
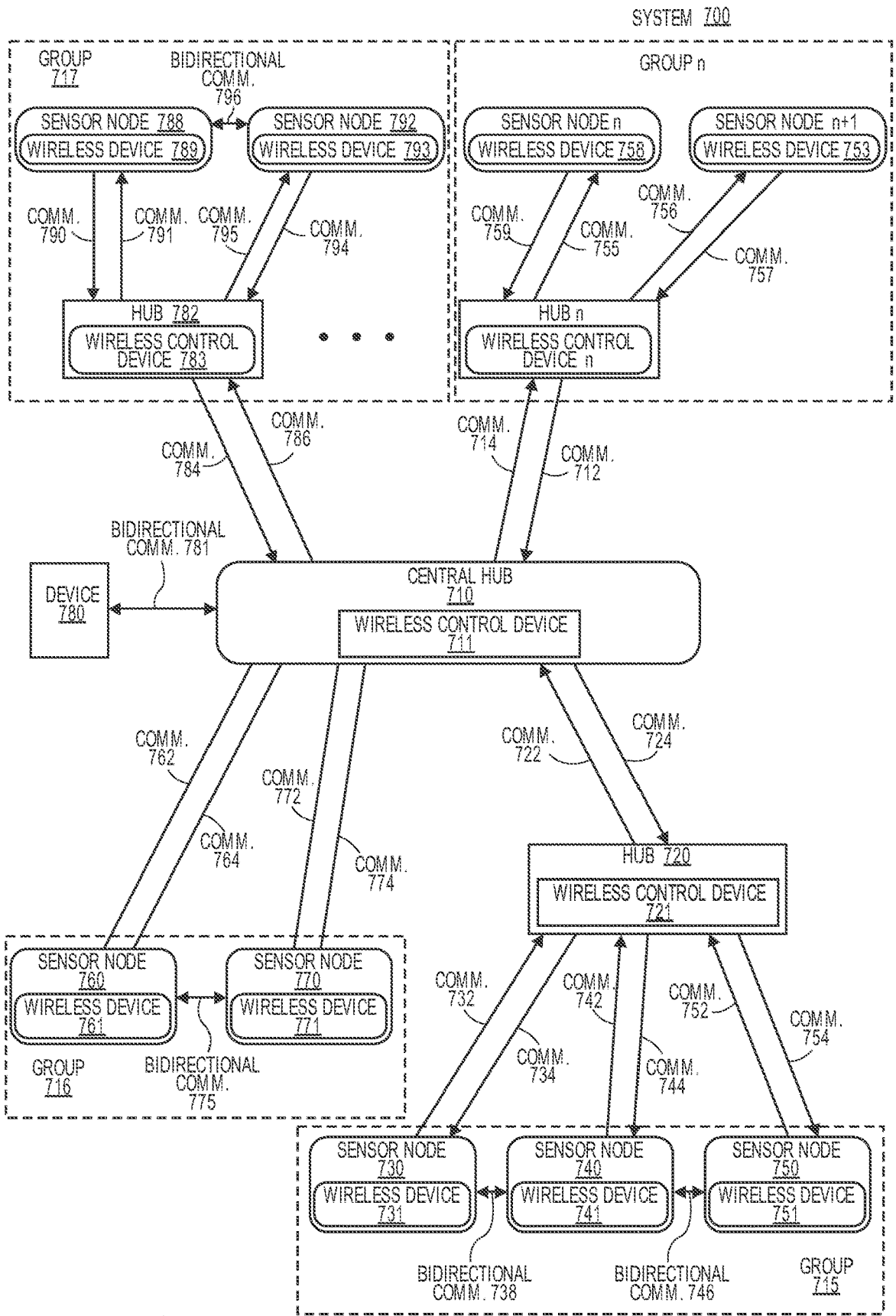
FIG. 2 shows a system with an asymmetric tree and mesh network architecture having multiple hubs for communicating in accordance with one embodiment.

FIG. 2 shows a system with an asymmetric tree and mesh network architecture having multiple hubs for communicating in accordance with one embodiment. The system 700 includes a central hub 710 having a wireless control device 711, hub 720 having a wireless control device 721, hub 782 having a wireless control device 783, and additional hubs including hub n having a wireless control device n. Additional hubs which are not shown can communicate with the central hub 710, other hubs, or can be an additional central hub. Each hub communicates bi-directionally with other hubs and one or more sensor nodes. The hubs are also designed to communicate bi-directionally with other devices including device 780 (e.g., client device, mobile device, tablet device, computing device, smart appliance, smart TV, etc.).

The sensor nodes 730, 740, 750, 760, 770, 788, 792, n, and n+1 (or terminal nodes) each include a wireless device 731, 741, 751, 761, 771, 789, 793, 758, and 753, respectively. A sensor node is a terminal node if it only has upstream communications with a higher level hub or node and no downstream communications with another hub or node. Each wireless device includes RF circuitry with a transmitter and a receiver (or transceiver) to enable bi-directional communications with hubs or other sensor nodes.

In one embodiment, the central hub 710 communicates with hubs 720, 782, hub n, device 780, and nodes 760 and 770. These communications include communications 722, 724, 774, 772, 764, 762, 781, 784, 786, 714, and 712 in the wireless asymmetric network architecture. The central hub having the wireless control device 711 is configured to send communications to other hubs and to receive communications from the other hubs for controlling and monitoring the wireless asymmetric network architecture including assigning groups of nodes and a guaranteed time signal for each group.

The hub 720 communicates with central hub 710 and also sensors nodes 730, 740, and 750. The communications with these sensor nodes include communications 732, 734, 742, 744, 752, and 754. For example, from the perspective of the hub 720, the communication 732 is received by the hub and the communication 734 is transmitted to the sensor node. From the perspective of the sensor node 730, the communication 732 is transmitted to the hub 720 and the communication 734 is received from the hub.

In one embodiment, a central hub (or other hubs) assign nodes 760 and 770 to a group 716, nodes 730, 740, and 750 to a group 715, nodes 788 and 792 to a group 717, and nodes n and n+1 to a group n. In another example, groups 716 and 715 are combined into a single group.

By using the architectures illustrated in FIGS. 1-2, nodes requiring long battery life minimize the energy expended on communication and higher level nodes in the tree hierarchy are implemented using available energy sources or may alternatively use batteries offering higher capacities or delivering shorter battery life. To facilitate achievement of long battery life on the battery-operated terminal nodes, communication between those nodes and their upper level counterparts (hereafter referred to as lowest-level hubs) may be established such that minimal transmit and receive traffic occurs between the lowest-level hubs and the terminal nodes.

In one embodiment, the nodes spend most of their time (e.g., more than 90% of their time, more than 95% of their time, approximately 98% or more than 99% of their time) in a low-energy non-communicative state. When the node wakes up and enters a communicative state, the nodes are operable to transmit data to the lowest-level hubs. This data may include node identification information, sensor data, node status information, synchronization information, localization information and other such information for the wireless sensor network.

Figure 3:
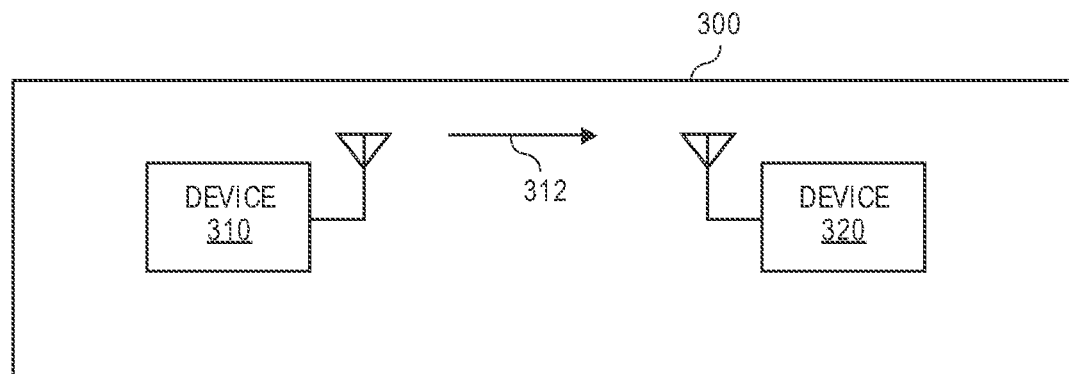
FIG. 3 illustrates a time of flight measurement system in accordance with one embodiment.

To determine the distance between two objects based on RF, ranging measurements are performed (i.e., RF communication is used to estimate the distance between the pair of objects). To achieve this, an RF signal is sent from one device to another. FIG. 3 illustrates a time of flight measurement system in accordance with one embodiment. A transmitting device 310 sends an RF signal 312, and a receiving device 320 receives the RF signal 312, as shown in FIG. 3. Here, in an exemplary wireless network, the device 310 may be a hub or a node, and the device 320 may also be a hub or a node.

Figure 4:
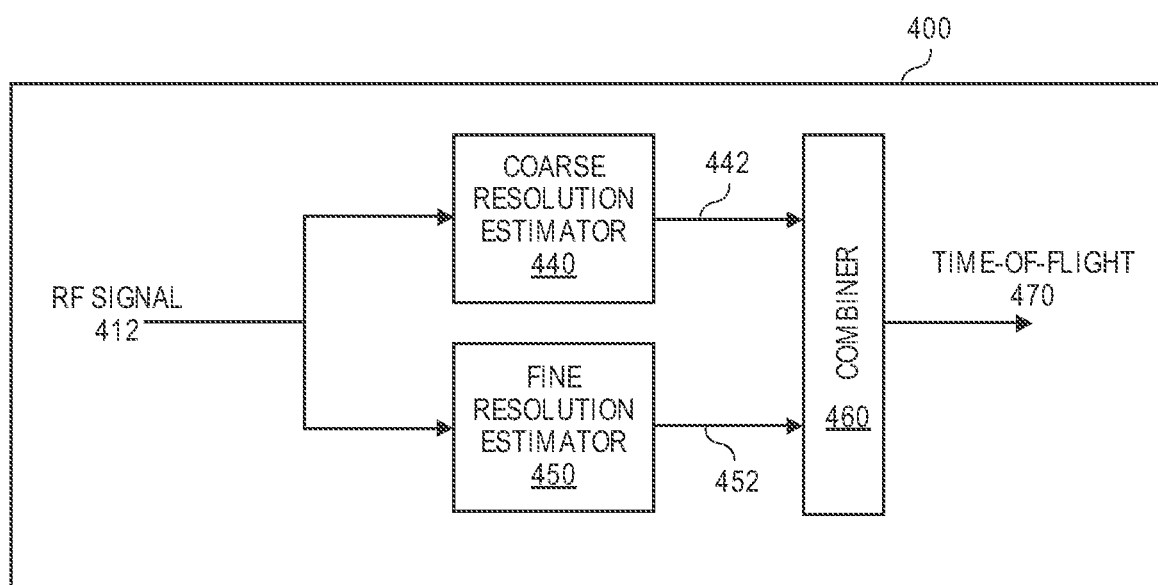
FIG. 4 illustrates a block diagram of a time of flight measurement system in accordance with one embodiment.

FIG. 4 illustrates a block diagram of a time of flight measurement system in accordance with one embodiment. A receiving device (e.g., device 320) receives the transmission from the transmitting device (e.g., device 310) and processes the RF signal 412 to generate at least one coarse estimation 442 using a coarse resolution estimator 440 and at least one fine estimation 452 of the propagation delay between the two devices over the air using a fine resolution estimator 450. The system 400 then utilizes a combiner 460 to combine the coarse time estimation 442 and the fine time estimation 452 to generate an accurate time-of-flight measurement 470. This time-of-flight measurement 470 can then be multiplied by the speed of light to calculate the distance, as shown in FIG. 4.

Figure 5:
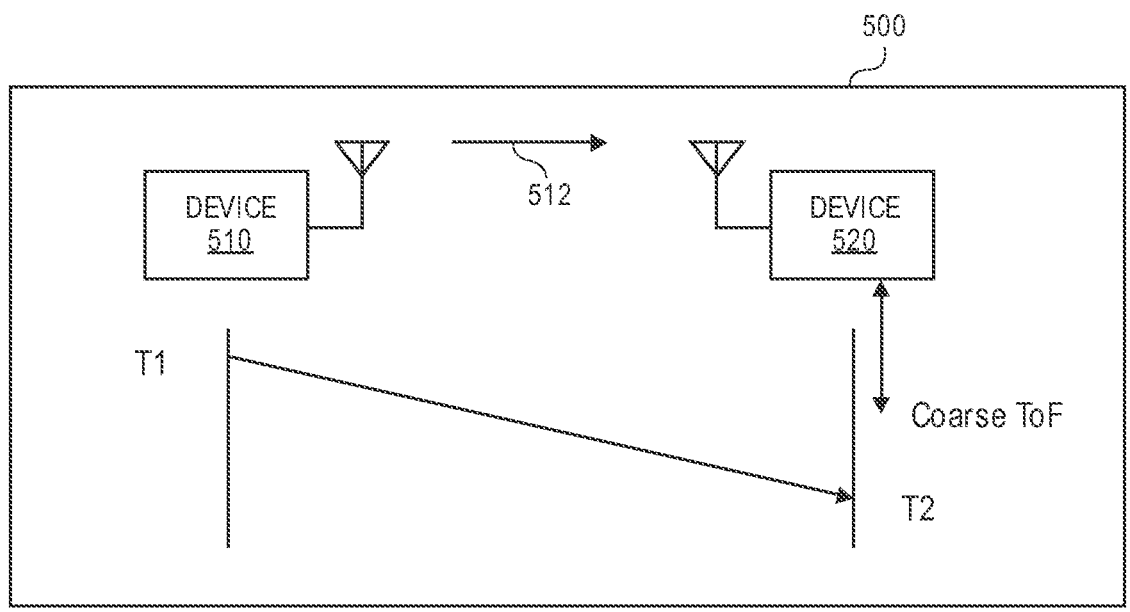
FIG. 5 illustrates a fully synchronous system that is used for distance estimation in accordance with one embodiment.
Figure 6:
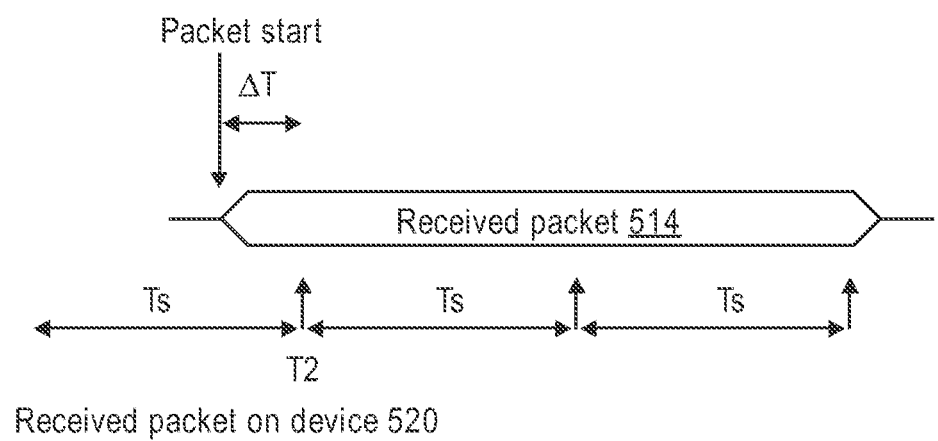
FIG. 6 illustrates how a packet of a recorded RF signal is a time-shifted version of a signal transmitted from device 510 in accordance with one embodiment.

Time of flight measurements are inherently sensitive to the timing of operations within the network, and therefore, the clocking of the devices performing the measurements is important. FIG. 5 illustrates a fully synchronous system that is used for distance estimation in accordance with one embodiment. In a fully synchronous system 500, i.e. both devices share the same clock reference, device 510 first sends a RF signal 512 (e.g., RF signal having a packet) to device 520 at time T1. The packet arrives at the device 520 at time T2 and triggers a packet detection algorithm in device 520 to register this time T2. Because it is a synchronous system, the coarse estimation of time of flight can be calculated as T2–T1. However, the resolution of this measurement is limited by the time resolution of the sampling clock, which will have a frequency of $f_s$ and a time resolution of Ts. The time resolution is illustrated in FIG. 6. Here, the sampling clock represents the maximum precision of time estimation of the system, and may, in an exemplary system, be set by the frequency of the clock used to control the circuitry used to detect the timing of transmission or reception. For example, if the sampling clock is 100 MHz, the resolution of this measurement will be at 10 nanoseconds (ns), which corresponds to roughly 10-foot accuracy.

In order to improve this accuracy, the RF signal 512 may be recorded and analyzed at device 520. FIG. 6 illustrates how a packet of a recorded RF signal is a time-shifted version of a signal transmitted from device 510 in accordance with one embodiment. At a sample clock time interval (Ts), a packet 514 of the RF signal 512 is detected at T2. The true beginning of the received packet 514 is a fraction period (e.g., $\Delta T$) of a sampling clock period earlier than T2.

Multiple methods can be used to estimate this fractional period (e.g., $\Delta T$). For example, the time domain signal can be converted into frequency domain using a fast fourier transform (FFT), then divided by the spectrum of the original signal to obtain the frequency response of the channel. In an orthogonal frequency-division multiplexing (OFDM) based system, this information can also be obtained from channel sense information (CSI). In an ideal channel over the air, the channel response in frequency domain is $$H(f) = A e^{j2\pi f \Delta T}$$

Where A is the loss of the channel and $\Delta T$ is the delay of the channel. FIG. 7A illustrates a phase response of an ideal channel in accordance with one embodiment. A plot of phase 202 on a vertical axis and frequency 204 on a horizontal axis illustrates an ideal channel 210 as a straight line with a slope corresponding to $2\pi * \Delta T$.

Combining $\Delta T$ with T2–T1, an accurate distance estimation can be established as:

$$\text{Distance} = (T2 - T1 - \text{slope}/(2\pi)) \times C$$

where C is the speed of light.

In the case of non-ideal channels, there are multiple reflections from the environment and the overall channel response can be annotated as $$H(f) = \Sigma A_k e^{j2\pi f \Delta T_k}$$

where $A_k$ is the amplitude of each path, and $\Delta T_k$ is the delay of each path. As a result, the channel response will differ from a straight line in phase. FIG. 7B illustrates a phase response of a non-ideal channel in accordance with one embodiment. A plot of phase 252 on a vertical axis and frequency 254 on a horizontal axis illustrates a non-ideal channel 260.

Advanced algorithms like Matrix Pencil, MUSIC, etc. can be used to estimate the minimum delay of the multiple paths ($\Delta T_k$), and the distance can be calculated from this extracted minimum delay.

$$\text{Distance} = (T2 - T1 - S\{H(f)\}) \times C$$

where $S\{H(f)\}$ is the result of minimum delay extraction from the channel response measurement, i.e. it should be equal to $\min\{\Delta T_k\}$.

By separating the system into coarse and fine estimation, high efficiency and high performance can be achieved simultaneously. The coarse time estimator can cover long range, albeit with reduced accuracy. Such low accuracy requirements also make this estimator less sensitive to interference and multi-path, which is an important error source for time-of-flight measurements. There are multiple methods that can be used to determine the coarse time estimation. For example, the coarse time can be extracted from timestamps that indicate the time when the signal is transmitted and when the signal is received. Alternatively, a measurement of the phase of signals received at multiple carrier frequencies can be unwrapped using the Chinese Remainder Theorem to estimate the coarse delay. A non-uniform discrete Fourier transform using a particular set of non-uniform carrier frequencies can also be used to estimate the coarse delay.

On the other hand, the fine resolution estimator only needs to cover a relatively short range, therefore reducing the computing resources needed for the system. The fine estimation is only required to cover a maximum delay of one coarse sample period. Advanced algorithms can also be applied to this estimator to improve the performance with interference and multi-path environments. This fine estimate can also be derived using multiple methods. For example, it can be derived from cross correlation of the received signal with an ideal version of the signal. It can also be derived from channel estimation using the received signal. The channel estimate can be converted into a fine delay estimate by using the slope of the phase, inverse FFT, matrix pencil, MUSIC, or other methods.

In linear algebra, matrix pencil is defined as a matrix-valued function with a complex variable $\lambda$ $$L(\lambda) = \Sigma \lambda^i A_i$$

In the context of ranging measurement, the channel response has a similar format of $$H(f) = H(n * f_{sub}) = \Sigma A_k e^{j2\pi f_{sub} \Delta T_k} = \Sigma A_k (e^{j2\pi f_{sub} \Delta T_k})^n = \Sigma A_k (\lambda)^n$$

where frequency domain measurement is performed at frequencies equally spaced by fsub (sub-carrier frequency).

The matrix-pencil method can therefore be used to extract the poles (λ) of such system. Once all possible poles ($\lambda_k$) are extracted from measurement, each time delay can be calculated as $$\Delta T_k = \log(\lambda_k)/(j2\pi f_{sub})$$

In another embodiment, a multiple signal classification (MUSIC) algorithm may be used. MUSIC is based on signal modeling consisting of a sum of harmonic signals $$X(n) = \Sigma A_k e^{j*wk*n}$$

Similar to the case of Matrix-Pencil, the channel response can be written as $$H(f) = H(n*f_{sub}) = \Sigma A_k e^{j*2\pi f*\Delta Tk} = \Sigma A_k e^{j*2\pi*f_{sub}*\Delta Tk*n}$$

The algorithm then extracts $A_k$ and $w_k$ based on the measurement results X(n), and the delay elements can be calculated as $$\Delta T_k = w_k/(2\pi f_{sub}))$$

In the systems described herein, noise, numerical errors, and other such limitations may cause the wrong delay to be estimated. If longer-than the actual time delay is estimated, the time delay result will not be affected because only the shortest delay is used for distance-related delay calculation. On the other hand, if a shorter-than time of flight delay is estimated, it can be mistaken as the actual time of flight delay. Therefore, it is important to eliminate false short paths to improve the time delay estimation accuracy. Therefore, in one embodiment, a system to correct for this error is implemented.

In a wireless environment, the amplitude of the signal decreases with distances quadratically as described by free-space-path-loss. Therefore, the shorter path estimated from the delay-estimation algorithm is expected to have a higher amplitude. This foreknowledge is then used to eliminate false short path estimates. The amplitude of the received signals can be normalized by multiplying the square of the estimated distance by the estimated amplitude. If this normalized amplitude is lower than a certain threshold, it is an indication that the estimation of this path is due to either noise or algorithm limitations, and therefore can be eliminated.

In practice, the actual signal strength also depends on the additional loss incurred on the path, including walls, windows, reflections, and etc. The threshold mentioned previously can be set according to the expected loss due to these factors, or can be set according to empirical data.

Figure 8A:
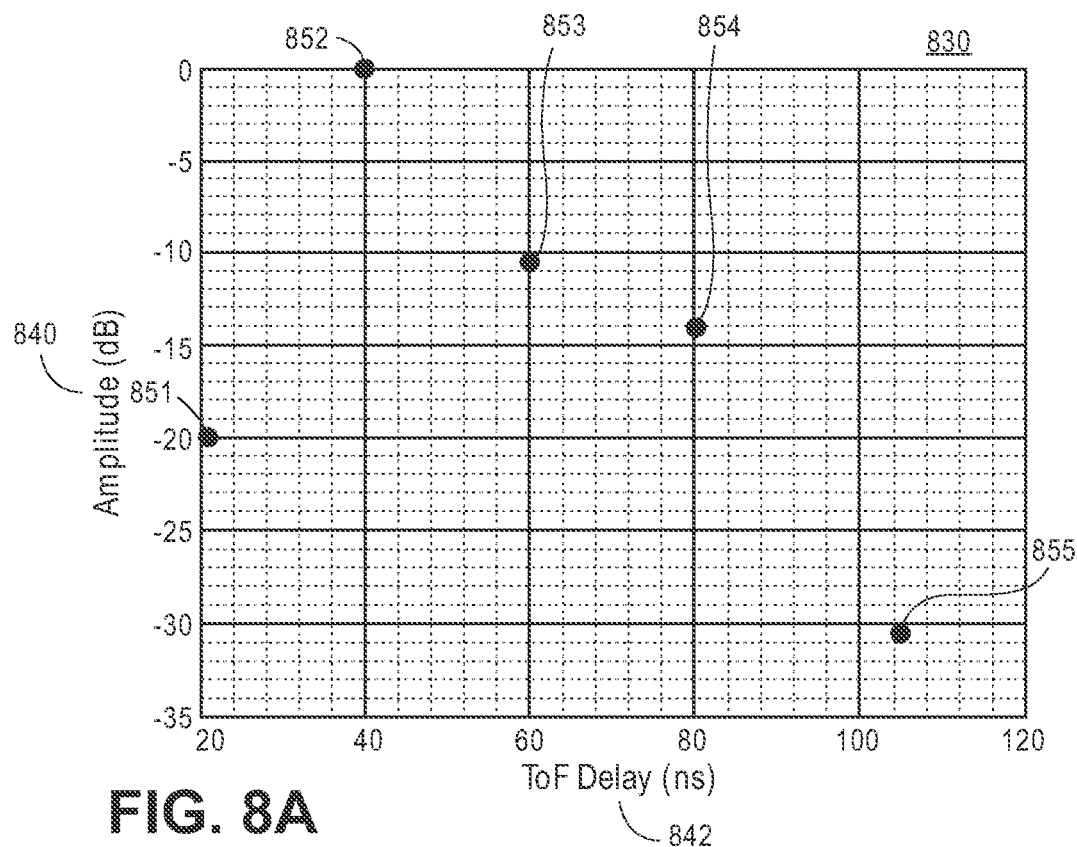
FIG. 8A shows measured signal amplitude as a function of the delay associated with exemplary paths for a plot 830 in accordance with one embodiment.
Figure 8B:
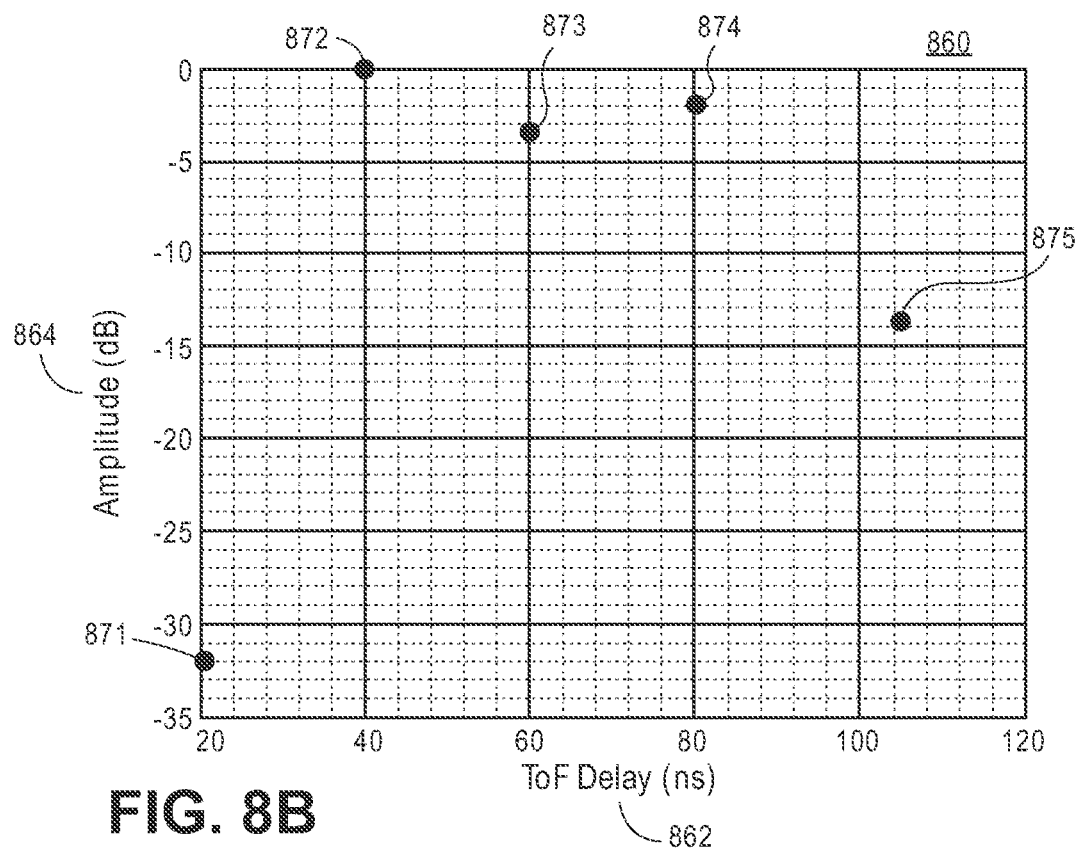
FIG. 8B illustrates a normalization of amplitude versus ToF delay in a plot 860 in accordance with one embodiment.

In one example, the path estimation algorithm may produce 5 paths. One of these paths may be generated due to noise and have a ToF delay estimate of 20 ns when the actual line of sight (LOS) delay is 40 ns. This is shown in FIGS. 8A and 8B. FIG. 8A shows the measured signal amplitude as a function of the delay associated with the 5 exemplary paths for a plot 830 in accordance with one embodiment. The plot 830 illustrates ToF delay (ns) 842 for 5 paths on a horizontal axis and measured signal amplitude (dB) 840 on a vertical axis. The data points 851-855 represent measured signal amplitudes for different ToF delays of the 5 paths. The data point 851 represents a potential false short path due to having a ToF delay of 20 ns that is less than the actual LOS delay of 40 ns. The LOS amplitude could be 1 and the amplitude of the false short path that is associated with the data point 851 could be 0.1. The amplitudes can be normalized by the square of the distance so the LOS amplitude is 1 and the normalized amplitude of the false path is 0.025. Such a normalization of amplitude versus ToF delay is shown in a plot 860 of FIG. 8B in accordance with one embodiment. The plot 860 illustrates ToF delay (ns) 862 for 5 paths on a horizontal axis and the normalization of the signal amplitude (dB) 864 on a vertical axis. The data points 871-875 represent normalization of the measured amplitudes for different ToF delays of the 5 paths. The data point 871 represents a potential false short path due to having a ToF delay of 20 ns that is less than the actual LOS delay of 40 ns. The normalized amplitude of the false path that is associated with the data point 871 is 32 dB below the LOS amplitude. In one example, if a maximum of 30 dB of loss from environmental factors (excluding path loss) is expected, then the 20 ns path that is associated with the data point 871 can be eliminated as a false short path estimate.

The threshold itself can also be a function of path length to account for the amount of environmental loss expected in a short distance versus a long distance. Other implementations could also incorporate the dynamic range of the physical hardware (e.g., dynamic operating range of signal levels of RF receivers of hubs, sensor nodes, etc.) in setting the threshold.

Figure 8C:
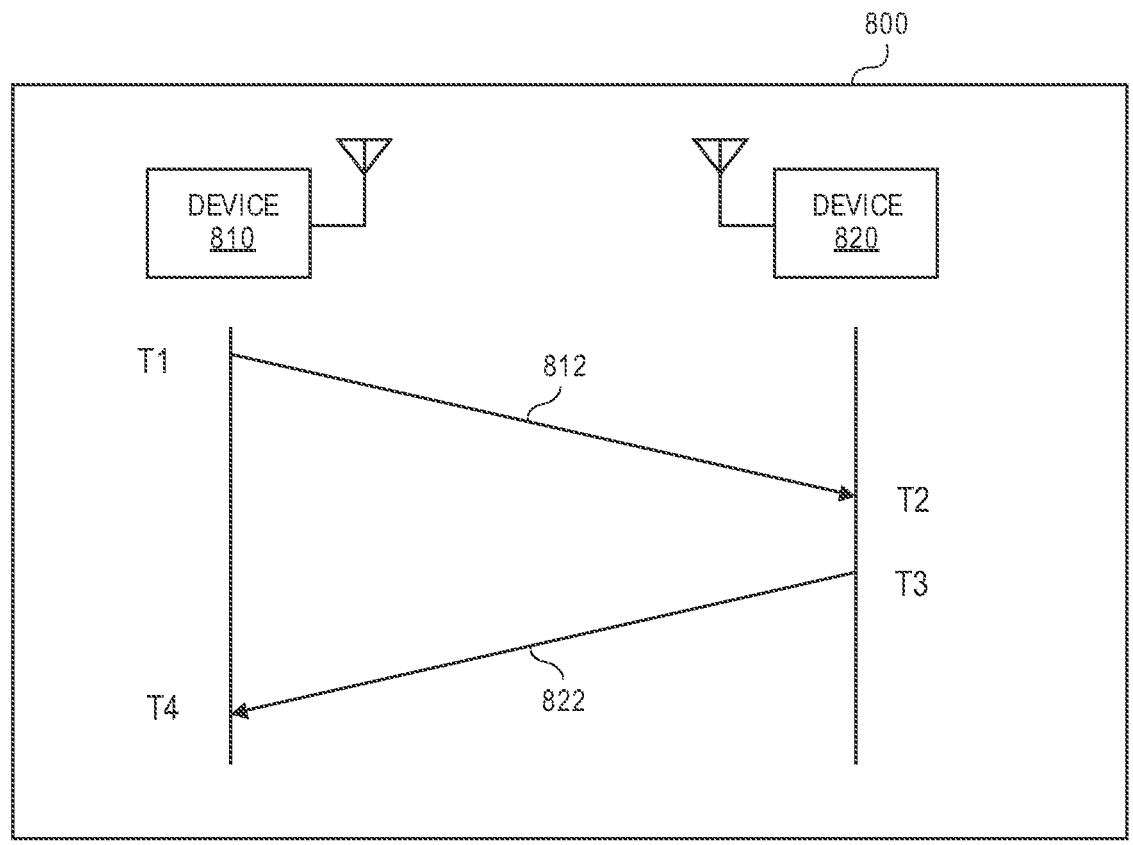
FIG. 8C illustrates an asynchronous system that is used for time of flight estimation in accordance with another embodiment.

In another embodiment, an asynchronous system is used for time of flight estimation. In the case where the two devices are asynchronous, timing offsets between devices can introduce large errors into the delay estimate. The aforementioned setup can be extended into a two-way system to mitigate this issue. FIG. 8C illustrates an asynchronous system that is used for time of flight estimation in accordance with another embodiment. A device 810 first sends a RF signal 812 having a packet to device 820 at time T1. The packet arrives at the device 820 at time T2, triggering the packet detection algorithm in device 820 to register this time. Device 820 then sends back a signal 822 having a packet at time T3, which arrives at device 810 at time T4 and triggers the device 810 to register the time and process the waveform. Notice that unlike the case of fully synchronous system, T1 and T4 are times recorded on device 810 and therefore is referenced to its reference clock. T2 and T3 are recorded based on the time reference of device 820. The coarse time estimation is done as $$2\times\text{ToF} = (T4-T1)-(T3-T2)$$

Because T4 and T1 are sampled at the same clock, there is no arbitrary phase between T4 and T1. Therefore, T4-T1 is accurate in time; the same principle applies to T3-T2. Therefore, this measurement is immune to any phase-walking between the two devices resulting from the asynchronous nature of this system. Similar to the previous embodiment, this measurement is limited by the resolution of the sampling clock period of T1/T2/T3/T4. In order to improve this accuracy, a frequency response measurement can be performed on both devices. Device 820 measures the channel response using the packet from device 810 and device 810 measures the channel response using the packet from device 820. Because the two devices are not synchronous, there is an uncertainty in the phase between the two clocks, annotated as $T_{offset}$ here. This phase offset of the clock manifests itself as an extra phase of the channel response measurement on each side, but it can be eliminated by multiplying the channel responses from the two sides. Assuming the channel response is the same as before, then the measurement from device 820 will be $$H_{820}(f) = H(f)e^{-j2\pi f T_{offset}}$$

The measurement from the device 810 will be $$H_{810}(f) = H(f)e^{+j2\pi f T_{offset}}$$

The combined channel response is therefore $$H_{810}(f)H_{820}(f)=H(f)^2=(\Sigma A_k e^{-j2\pi f \Delta Tk})^2$$

which cancels out the phase difference between the two clocks. Similar to the previous embodiment, algorithms such as matrix pencil, MUSIC, etc. can be used to estimate the delay from $H_{810}(f) H_{820}(f)$, which produces the $2\min\{\Delta T_k\}$, and the distance measurement is given by $$\text{Distance}=[(T4-T1)/2-(T3-T2)/2-S\{H_{810}(f)H_{820}(f)\}/2]\times C$$

Alternatively $T_{\textit{offset}}$ can be estimated from $$H_{810}(f)/H_{820}(f)=e^{+2j2\pi f T offset}$$

The $T_{\textit{offset}}$ is half the phase slope of the divided channel responses. The channel response in either direction can be corrected by the calculated offset. The distance estimation can then be calculated as $$\text{Distance}=[(T4-T1)/2-(T3-T2)/2-S\{H_{810}(f)\}-T_{\textit{offset}}]\times C$$

Or $$\text{Distance}=[(T4-T1)/2-(T3-T2)/2-S\{H_{820}(f)\}+T_{\textit{offset}}]\times C$$

This method has advantages over the multiplication method. The $H(f)^2$ channel response includes terms at double the amplitude and distance of each path as well as cross terms for every 2 path permutation. That is for a 2 path case, $A_{810}^2 e^{j2\pi f 2 \Delta T1}$, $A_{820}^2 e^{j2\pi f 2 \Delta T2}$, and $A_{810}A_{820} e^{j2\pi f (\Delta T1+\Delta T2)}$. The fine estimation methods are more effective and more robust to noise when applied to the unidirectional channel response H(f) as there are less paths to distinguish and lower dynamic range.

The channel estimate can also be combined with the coarse delay estimate before estimating the total path delays. The coarse delay can be added to the channel estimate as a linear phase shift. In the synchronous case it is:

$$T_{coarse}=1/2((T_4-T_1)-(T_3-T_2))$$

$$H_{tot}(f)=H(f)e^{-j2\pi f T_{coarse}}$$

In the case of an asynchronous system, the calculated clock phase offset is also applied as an addition or subtraction of a linear phase shift to the forward or reverse channel estimate.

$$H_{tot}(f)^2=H(f)^2 e^{-j2\pi 2 f T_{coarse}}$$

Or $$H_{tot}(f)=H_{forw}(f)e^{-j2\pi f T_{coarse}} e^{j2\pi f T_{offset}}$$

Or $$H_{tot}(f)=H_{rev}(f)e^{-j2\pi f T_{coarse}} e^{-j2\pi f T_{offset}}$$

Then matrix pencil, MUSIC, or other methods can be applied to the coarse plus fine channel estimate. This allows all of the estimated paths to be real distances relative to 0 distance. This aids in the elimination of false short paths and the selection of the line of sight path.

If the nodes have synchronous clocks, then the channel estimate (with or without the coarse delay correction) can be averaged across multiple packets or multiple wireless transmissions. This averaging can be performed before using matrix pencil, MUSIC, or other methods for path estimation. Averaging of the channel estimate improves the signal to noise ratio (SNR) as long as the multiple channel estimates are measured quickly relative to changes in the channel (the channel coherence time). Higher SNR improves the accuracy of the path estimation and allows weaker paths to be distinguished from noise.

In an asynchronous system, the phase offset correction methods described above also allow averaging multiple channel estimates. When using the multiplication method the Htot(f)$^2$ can be averaged across multiple transmissions. When using the division method, Htot(f) can be averaged across multiple transmissions.

The aforementioned short path elimination algorithm can also be used in asynchronous systems such as those disclosed above.

Figure 9A:
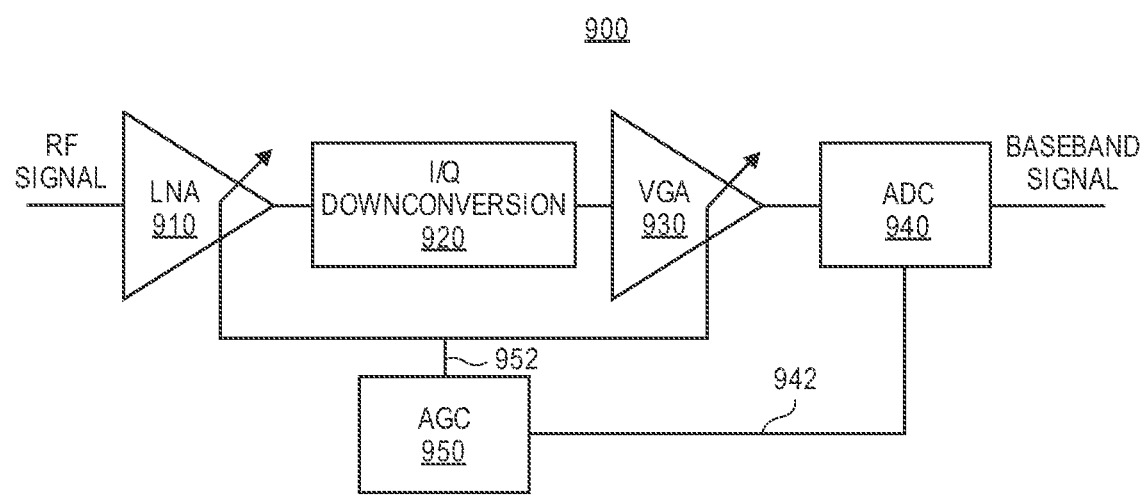
FIG. 9A illustrates a calibration system having automatic gain control in accordance with one embodiment.

As is apparent from the above embodiments, measurement of timing is critical to establishment of distance estimation. Errors in timing can reduce accuracy of distance estimation. Timing errors often exist within wireless systems. For example, automatic gain control (AGC) is commonly used to ensure robust receiver operation for signals of varying signal strength. During operation, AGC stages may have delays that vary based on the gain. As such, these variations in delay can add to the uncertainty of TOF estimation. In one embodiment, this error can be minimized through calibration. The delay as a function of AGC stage gain may be pre-measured and used to correct the timing during the actual TOF measurement, by subtracting such deviations from the baseline delay. FIG. 9A illustrates RF circuitry having automatic gain control in accordance with one embodiment. The RF circuitry 900 (e.g., 1550, 1670, 1692, 1770, 1870, etc.) can be included in any wireless node (e.g., hub, sensor node) as described in embodiments of the present disclosure. The RF circuitry 900 includes a low noise amplifier to receive a RF signal and to generate an amplified signal sent to an in-phase quadrature (I/Q) down-conversion unit 920 to downconvert RF signals to a desired intermediate frequency. A variable gain amplifier 930 amplifiers the intermediate frequency signal and then an analog to digital converter (ADC) converts the amplified signal into a baseband signal. The AGC 950 is a closed-loop feedback regulating circuit that provides a controlled signal amplitude at its output 952 despite variation of the amplitude in its input 942. As discussed above, the delay as a function of AGC stage gain (e.g., AGC 950) may be pre-measured and used to correct the timing during the actual TOF measurement, by subtracting such deviations from a baseline pre-measured delay. Similarly, other calibrated system configurations such as filter delay may be pre-measured and deducted as well.

Figure 9B:
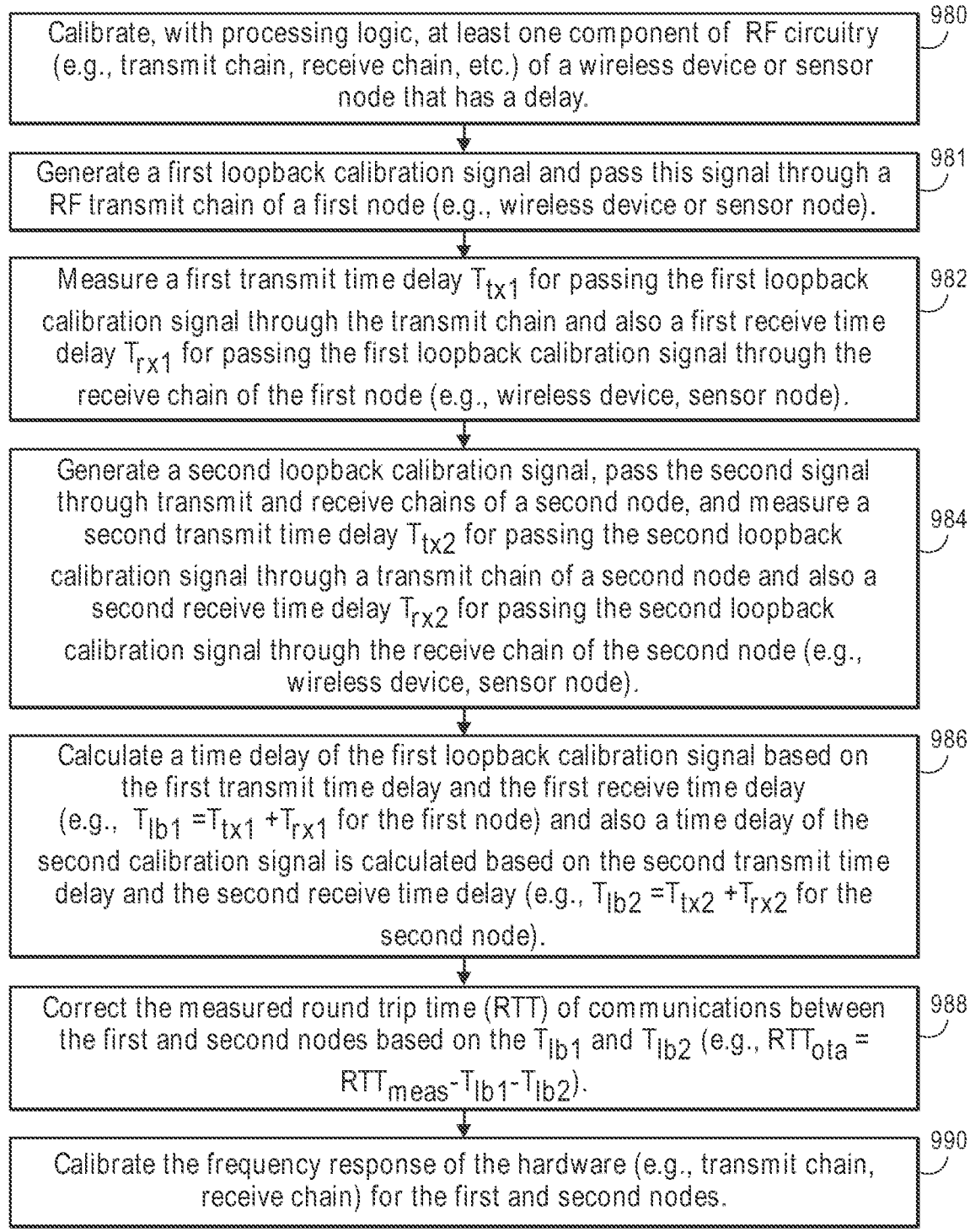
FIG. 9B illustrates a method for removing hardware delays and non-idealities using a loopback calibration in accordance with one embodiment.

FIG. 9B illustrates a method for removing hardware delays and non-idealities using a loopback calibration in accordance with one embodiment. The operations of this method may be executed by a wireless device, a wireless control device of a hub (e.g., an apparatus), a system, or a remote device or computer which includes processing circuitry or processing logic. The processing logic may include hardware (circuitry, dedicated logic, etc.), software (such as is run on a general purpose computer system or a dedicated machine or a device), or a combination of both. In one embodiment, an anchor node, a hub, a wireless device, or a remote device or computer performs the operations of this method. Algorithms associated with the various computations may be performed in a remote computer to which the relevant data associated with distance measurements is sent. The remote device or computer may be at a different location (e.g., different network, in the cloud) than the wireless network architecture having a plurality of wireless nodes. The remote device or computer may be at a different location within the wireless network architecture than certain nodes that are transmitted and receiving communications within the wireless network architecture.

During a manufacturing process of components of a wireless network architecture or upon initialization of the wireless network architecture, at operation 980, the processing logic calibrates at least one component of RF circuitry (e.g., transmit chain, receive chain, etc.) of a wireless device or sensor node that has a delay. The calibration of at least one component may include generating a first loopback calibration signal and passing this signal through a RF transmit chain of a first node (e.g., wireless device or sensor node) at operation 981. This first loopback calibration signal is not necessarily transmitted over the air. The transmit chain is connected to a receive chain of the wireless device or sensor node explicitly or through on chip leakage. This connection can be performed at any point in the RF chain. In one example, the RF transmit and receive chains are set to be active simultaneously. The blocks of the RF transmit chain that the first loopback calibration signal travels through before looping back through the RF receive chain can be characterized and calibrated for later measurements. At operation 982, the processing logic measures a first transmit time delay $T_{tx1}$ for passing the first loopback calibration signal through the transmit chain and also a first receive time delay $T_{rx1}$ for passing the first loopback calibration signal through the receive chain of the first node (e.g., wireless device, sensor node). At operation 984, the processing logic generates a second loopback calibration signal, passes the second signal through transmit and receive chains of a second node, and measures a second transmit time delay $T_{tx2}$ for passing the second loopback calibration signal through a transmit chain of a second node and also a second receive time delay $T_{rx2}$ for passing the second loopback calibration signal through the receive chain of the second node (e.g., wireless device, sensor node).

At operation 986, the processing logic can calculate a time delay of the first loopback calibration signal based on the first transmit time delay and the first receive time delay (e.g., $T_{lb1}=T_{tx1}+T_{rx1}$ for the first node) and also a time delay of the second calibration signal is calculated based on the second transmit time delay and the second receive time delay (e.g., $T_{lb2}=T_{tx2}+T_{rx2}$ for the second node). Then at operation 988 the measured RTT for communications transmitted between the first and second nodes can be corrected based on the $T_{lb1}$ and $T_{lb2}$ (e.g., $RTT_{ota}=RTT_{meas}-T_{lb1}-T_{lb2}$).

At operation 990, the processing logic calibrates the frequency response of the hardware (e.g., transmit chain, receive chain) for the first and second nodes. In one example, the loopback calibration can provide $H_{lb1}=H_{tx1}*H_{rx1}$ for the first node and $H_{lb2}=H_{tx2}*H_{rx2}$ for the second node. The loopback calibration further provides $H_{ota2}(f)=H_{meas2}(f)/(H_{lb1}*H_{lb2})$. In the unidirectional case, the loopback calibration from just the receive side, just the transmit side, or some combination of the two (average, etc) can be used. For example, $H_{ota}(f)=H_{meas}(f)/H_{lb2}$.

The loopback can be done as part of production or factory testing and results stored in memory. Alternatively, the loopback can be performed periodically during normal operation. Performing periodically during normal operation allows changes in hardware delays and non-idealities over time, temperature, etc to be calibrated and corrected automatically. In the production or factory test method, variations over temperature would need to be characterized. An on chip or on-board temperature sensor could be used to adjust the calibration correction depending on the characterized temperature profile.

In one embodiment, the baseband hardware allows full duplex operation. In this case, the signal can be transmitted and then immediately received after going through the transmit and receive chains. The CSI, transmit, and receive timestamps are combined to generate a calibration profile for the hardware. The delay can be extracted and removed directly or the frequency response of the hardware itself can be removed from subsequent measurements.

In another embodiment, the baseband is not full duplex. In this case the transmit packet can be generated independently from the baseband. The raw data for a packet can be stored in memory and read out directly to a digital-to-analog converter (DAC). It goes through the transmit (TX) and receive (RX) RF chains as before. The baseband is set to be in receive mode and can capture the CSI and timestamp of the incoming packet. The CSI, transmit, and receive timestamps can be used as in the previous case. The transmit timestamp needs to be captured at the time the memory readout to the DAC is triggered.

Figure 10:
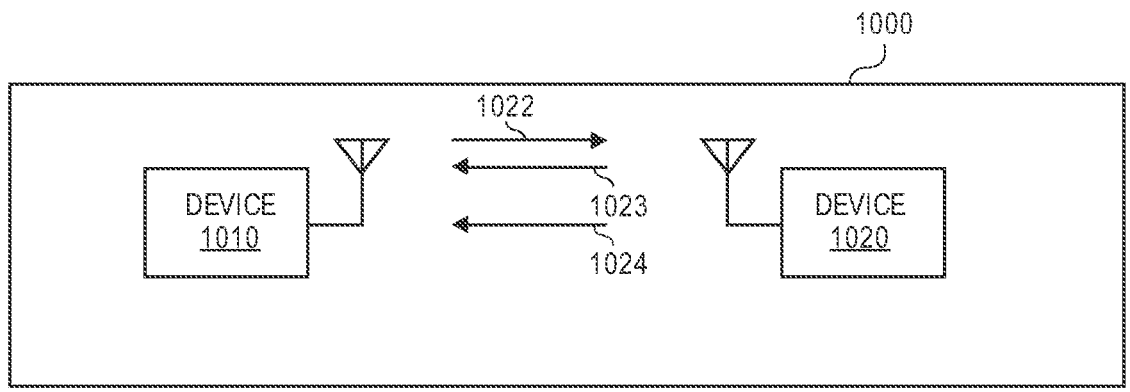
FIG. 10 illustrates in one embodiment a 2-way ToF measurement system 1000.

As shown above, in an asynchronous system, the information from the two devices needs to be combined for calculation. In order to do that, in one embodiment, one of the devices can send the information to the other device, either using the same RF signals (e.g., 812, 822, 1022, 1023) mentioned before, or using an independent RF signal path 1024, as shown in FIG. 10 in one embodiment of a 2-way ToF measurement system 1000.

Figure 11:
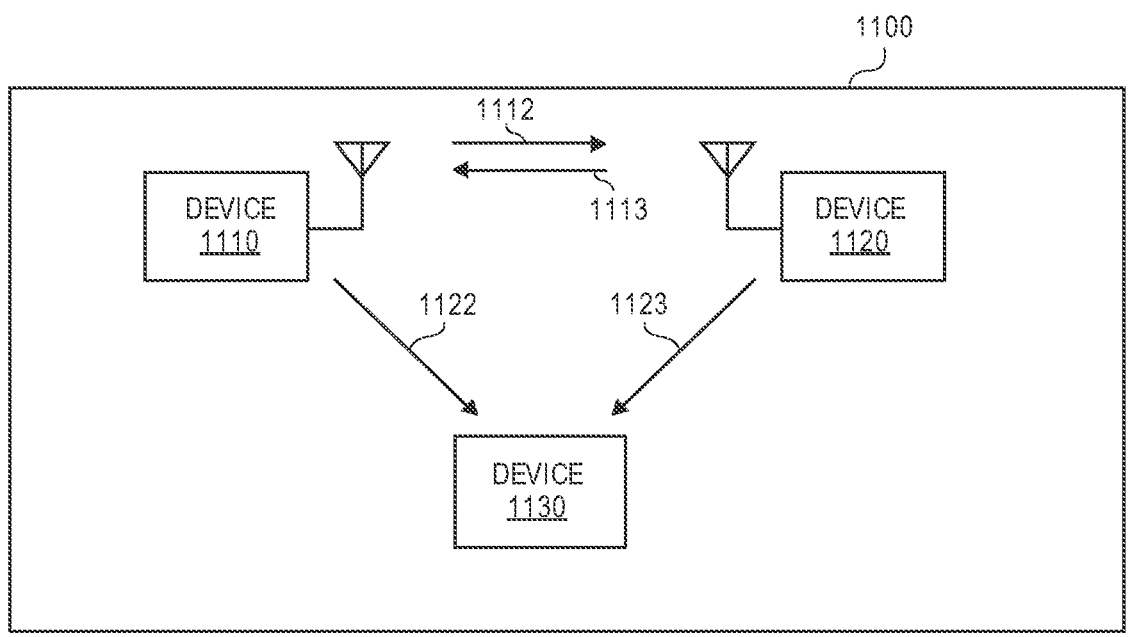
FIG. 11 illustrates an asynchronous system 1100 in accordance with an alternative embodiment.

FIG. 11 illustrates an asynchronous system 1100 in accordance with an alternative embodiment. Devices 1110 and 1120 can send their information to a third device 1130 through the same RF signals 1112 and 1113 or independent RF signals 1122 and 1123, and the third device 1130 can process and combine the information to calculate time-of-flight.

Once distances between the various pairs on the networks are established, the information can be passed to one or more members of the network or even to systems outside the network for estimation of relative and/or absolute locations of the various members of the network. This can be performed using a variety of techniques. For example, triangulation approaches may be used as are well known to those of skill in the art. Error minimization techniques such as least squares approaches may be used to improve accuracy and reduce errors of position estimation. Such approaches may be used to reduce any errors associated with distance estimation in the embodiments above by taking advantage of the redundant information produced in the various paired distance estimates. Other techniques that may be used to perform localization based on the determined ranging data include multi-dimensional scaling, self-positioning algorithm, terrain algorithm, collaborative multilateration, distributed maximum likelihood, hyperbolic position fix, mobile geographic distributed localization, elastic localization algorithm, and other such anchor-free and anchor-based localization algorithms.

The localization information determined herein may be used to facilitate or improve the operation of a wireless sensor network. An exemplary wireless sensor network is disclosed in U.S. patent application Ser. No. 14/925,889 filed on Aug. 19, 2015, which is incorporated by reference herein. The localization may be used to establish logical and/or functional relationships within the network. In one exemplary embodiment, localization information may be used to define constellation membership in a sensor network that allows node-to-node communication with a constellation of a normally tree-like network, such as shown in FIG. 2. In this embodiment, localization is used to identify nodes that should be assigned to be within the same constellation. These may then communicate directly with each other without going through the hub. An advantage of this approach is that errors in distance estimate that survive triangulation calculations will not cause catastrophic failure of the network; rather, at most, these errors will cause erroneous assignment of constellations. Use of overlapping constellation assignments or loose constellation assignment rules may further be used to prevent this from impacting network performance in an undesirable manner.

In one embodiment, a Location Algorithm includes anchor-based Triangulation. In an anchor-based system, the location of anchor nodes (e.g., hubs, sensors, devices, etc.) is known. The unknown location of other devices is calculated based on the known location of the anchors as well as the measured distance between each device and each anchor. The location of these unknown devices is calculated one by one with the same procedure. For each of the devices, the distance measurement with anchor i is:

$$d_i = \sqrt{(x-x_i)^2+(y-y_i)^2+(z-z_i)^2} + n_i$$

where $x_i$, $y_i$, and $z_i$ are the coordinates of the ith anchor; $d_i$ is the measured distance between the unknown device and the ith anchor; x, y, and z are the coordinates of the unknown device, which is the goal of the estimation. By setting up different error function for the estimation, one can use linear least squares to calculate the location of the unknown device (x,y,z).

In another embodiment, for an Anchor-less Triangulation setup, there is no known location for any of the devices. The algorithm has to use the distance measurement between pairs of the devices to determine the relative location of each device. The goal is to find out the relative location of all devices to minimize the overall error of the distance measurement. There are multiple types of algorithms including an incremental algorithm and a concurrent algorithm. An incremental algorithm starts with a small set of devices and calculates their locations based on distance measurement. The small set of device is then used as anchor nodes for other devices. It is a simple algorithm but with the drawback that the error in early calculated nodes can be easily propagated to the later nodes, even with an advanced algorithm which updates location of the early nodes.

A concurrent algorithm solves the issue of the incremental algorithm due to the concurrent algorithm estimating all locations at the same time to achieve a global optimum with lower error than incremental algorithm. It usually uses iterative process to update the location of the devices, therefore it will take longer time to converge while using more computation power and memory.

FIG. 12 illustrates a method for determining location estimation of nodes using time of flight techniques in accordance with one embodiment. The operations of method 1200 may be executed by a wireless device, a wireless control device of a hub (e.g., an apparatus), a system, or a remote device or computer which includes processing circuitry or processing logic. The processing logic may include hardware (circuitry, dedicated logic, etc.), software (such as is run on a general purpose computer system or a dedicated machine or a device), or a combination of both. In one embodiment, an anchor node, a hub, a wireless device, or a remote device or computer performs the operations of method 1200. Algorithms associated with the various computations may be performed in a remote computer to which the relevant data associated with distance measurements is sent. The remote device or computer may be at a different location (e.g., different network, in the cloud) than the wireless network architecture having a plurality of wireless nodes. The remote device or computer may be at a different location within the wireless network architecture than certain nodes that are transmitted and receiving communications within the wireless network architecture.

Upon initialization of a wireless network architecture, at operation 1201, the processing logic calibrates at least one component (e.g., automatic gain control (AGC) stage of the RF circuitry, filter stage of the RF circuitry, etc.) that has a delay. The calibration of at least one component may include measuring a delay of the at least one component (e.g., AGC stage as a function of gain, filter stage), determining if a deviation exists between the measured delay and a baseline delay of the at least one component, and correcting a timing of the determined time of flight estimate if a deviation exists. The calibration typically occurs during the initialization of the wireless network architecture. Alternatively, the calibration may occur at a later time of the method 1200.

At operation 1202, the hub (or anchor node, wireless device, remote device or computer) having radio frequency (RF) circuitry and at least one antenna transmits communications to a plurality of sensor nodes in the wireless network architecture (e.g., wireless asymmetric network architecture). At operation 1203, the RF circuitry and at least one antenna of the hub (or anchor node, wireless device, remote device or computer) receives communications from the plurality of sensor nodes each having a wireless device with a transmitter and a receiver to enable bi-directional communications with the RF circuitry of the hub in the wireless network architecture. At operation 1205, processing logic of a hub (or anchor node, wireless device, remote device or computer) having a wireless control device initially causes a wireless network of sensor nodes to be configured as a mesh-based network architecture for a time period (e.g., predetermined time period, time period sufficient for localization, etc.).

At operation 1206, the processing logic of the hub (or anchor node, wireless device, remote device or computer) determines localization of at least two nodes (or all nodes) using at least one time of flight technique and possibly a signal strength technique as discussed in the various embodiments disclosed herein.

At operation 1208, upon localization of the at least two network sensor nodes being complete, the processing logic of the hub (or anchor node, wireless device, remote device or computer) terminates time of flight measurements if any time of flight measurements are occurring and continues monitoring the signal strength of communications with the at least two nodes. Similarly, the at least two nodes may monitor the signal strength of communications with the hub. At operation 1210, the processing logic of the hub (or anchor node, wireless device, remote device or computer) configures the wireless network in a tree based or tree-like network architecture (or tree architecture with no mesh-based features) upon completion of localization.

The communication between hubs and nodes as discussed herein may be achieved using a variety of means, including but not limited to direct wireless communication using radio frequencies, Powerline communication achieved by modulating signals onto the electrical wiring within the house, apartment, commercial building, etc., WiFi communication using such standard WiFi communication protocols as 802.11a, 802.11b, 802.11n, 802.11ac, and other such Wifi Communication protocols as would be apparent to one of ordinary skill in the art, cellular communication such as GPRS, EDGE, 3G, HSPDA, LTE, and other cellular communication protocols as would be apparent to one of ordinary skill in the art, Bluetooth communication, communication using well-known wireless sensor network protocols such as Zigbee, and other wire-based or wireless communication schemes as would be apparent to one of ordinary skill in the art.

The implementation of the radio-frequency communication between the terminal nodes and the hubs may be implemented in a variety of ways including narrow-band, channel overlapping, channel stepping, multi-channel wide band, and ultra-wide band communications.

The hubs may be physically implemented in numerous ways in accordance with embodiments of the invention. FIG. 13A shows an exemplary embodiment of a hub implemented as an overlay 1500 for an electrical power outlet in accordance with one embodiment. The overlay 1500 (e.g., faceplate) includes a hub 1510 and a connection 1512 (e.g., communication link, signal line, electrical connection, etc.) that couples the hub to the electrical outlet 1502. Alternatively (or additionally), the hub is coupled to outlet 1504. The overlay 1500 covers or encloses the electrical outlets 1502 and 1504 for safety and aesthetic purposes.

FIG. 13B shows an exemplary embodiment of an exploded view of a block diagram of a hub 1520 implemented as an overlay for an electrical power outlet in accordance with one embodiment. The hub 1520 includes a power supply rectifier 1530 that converts alternating current (AC), which periodically reverses direction, to direct current (DC) which flows in only one direction. The power supply rectifier 1530 receives AC from the outlet 1502 via connection 1512 (e.g., communication link, signal line, electrical connection, etc.) and converts the AC into DC for supplying power to a controller circuit 1540 via a connection 1532 (e.g., communication link, signal line, electrical connection, etc.) and for supplying power to RF circuitry 1550 via a connection 1534 (e.g., communication link, signal line, electrical connection, etc.). The controller circuit 1540 includes memory 1542 or is coupled to memory that stores instructions which are executed by processing logic 1544 (e.g., one or more processing units) of the controller circuit 1540 for controlling operations of the hub for forming, monitoring, and performing localization of the wireless asymmetrical network as discussed herein. The RF circuitry 1550 may include a transceiver or separate transmitter 1554 and receiver 1556 functionality for sending and receiving bi-directional communications via antenna(s) 1552 with the wireless sensor nodes. The RF circuitry 1550 communicates bi-directionally with the controller circuit 1540 via a connection 1534 (e.g., communication link, signal line, electrical connection, etc.). The hub 1520 can be a wireless control device 1520 or the controller circuit 1540, RF circuitry 1550, and antenna(s) 1552 in combination may form the wireless control device as discussed herein.

Figure 14B:
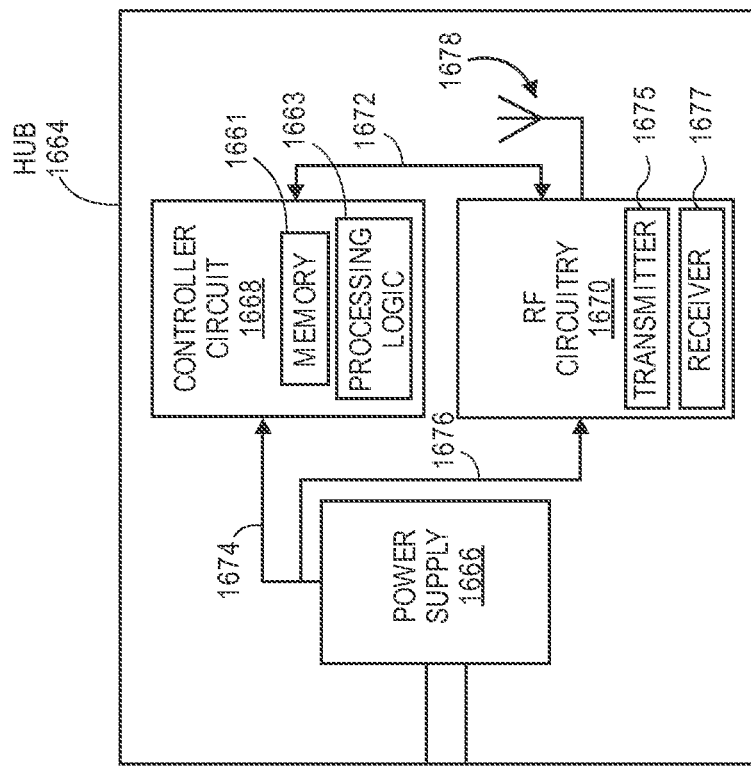
FIG. 14B shows an exemplary embodiment of a block diagram of a hub 964 implemented as a card for deployment in a computer system, appliance, or communication hub in accordance with one embodiment.
Figure 14A:
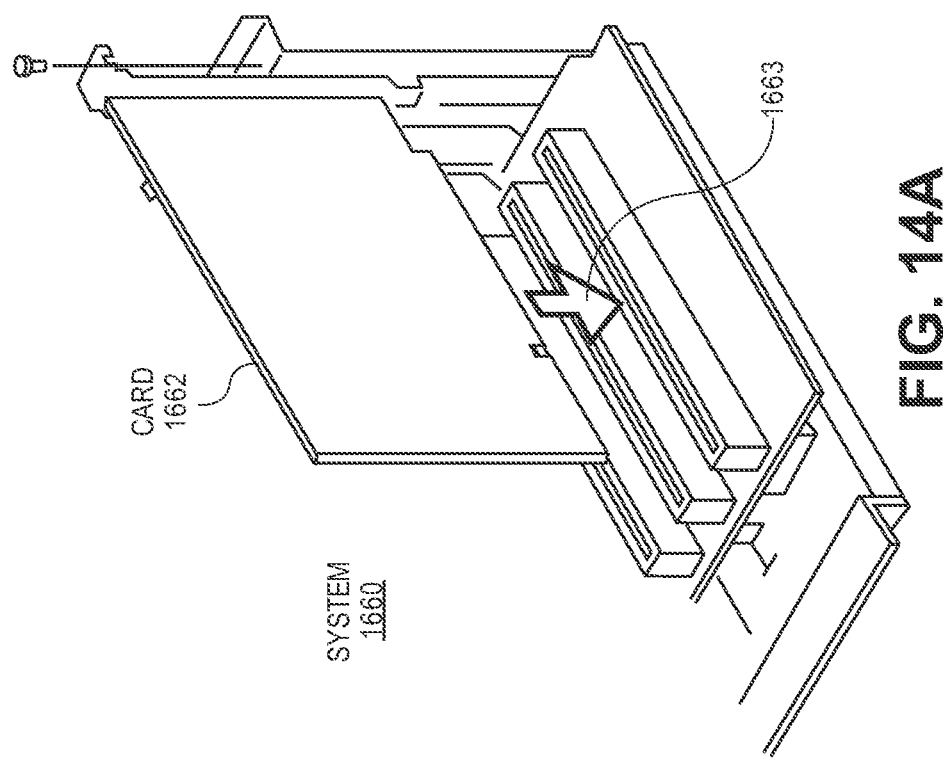
FIG. 14A shows an exemplary embodiment of a hub implemented as a card for deployment in a computer system, appliance, or communication hub in accordance with one embodiment.

FIG. 14A shows an exemplary embodiment of a hub implemented as a card for deployment in a computer system, appliance, or communication hub in accordance with one embodiment. The card 1662 can be inserted into the system 1660 (e.g., computer system, appliance, or communication hub) as indicated by arrow 1663.

FIG. 14B shows an exemplary embodiment of a block diagram of a hub 1664 implemented as a card for deployment in a computer system, appliance, or communication hub in accordance with one embodiment. The hub 1664 includes a power supply 1666 that provides power (e.g., DC power supply) to a controller circuit 1668 via a connection 1674 (e.g., communication link, signal line, electrical connection, etc.) and provides power to RF circuitry 1670 via a connection 1676 (e.g., communication link, signal line, electrical connection, etc.). The controller circuit 1668 includes memory 1661 or is coupled to memory that stores instructions which are executed by processing logic 1663 (e.g., one or more processing units) of the controller circuit 1668 for controlling operations of the hub for forming, monitoring, and performing localization of the wireless asymmetrical network as discussed herein. The RF circuitry 1670 may include a transceiver or separate transmitter 1675 and receiver 1677 functionality for sending and receiving bi-directional communications via antenna(s) 1678 with the wireless sensor nodes. The RF circuitry 1670 communicates bi-directionally with the controller circuit 1668 via a connection 1672 (e.g., communication link, signal line, electrical connection, etc.). The hub 1664 can be a wireless control device 1664 or the controller circuit 1668, RF circuitry 1670, and antenna(s) 1678 in combination may form the wireless control device as discussed herein.

FIG. 14C shows an exemplary embodiment of a hub implemented within an appliance (e.g., smart washing machine, smart refrigerator, smart thermostat, other smart appliances, etc.) in accordance with one embodiment. The appliance 1680 (e.g., smart washing machine) includes a hub 1682.

FIG. 14D shows an exemplary embodiment of an exploded view of a block diagram of a hub 1684 implemented within an appliance (e.g., smart washing machine, smart refrigerator, smart thermostat, other smart appliances, etc.) in accordance with one embodiment. The hub includes a power supply 1686 that provides power (e.g., DC power supply) to a controller circuit 1690 via a connection 1696 (e.g., communication link, signal line, electrical connection, etc.) and provides power to RF circuitry 1692 via a connection 1698 (e.g., communication link, signal line, electrical connection, etc.). The controller circuit 1690 includes memory 1691 or is coupled to memory that stores instructions which are executed by processing logic 1688 (e.g., one or more processing units) of the controller circuit 1690 for controlling operations of the hub for forming, monitoring, and performing localization of the wireless asymmetrical network as discussed herein. The RF circuitry 1692 may include a transceiver or separate transmitter 1694 and receiver 1695 functionality for sending and receiving bi-directional communications via antenna(s) 1699 with the wireless sensor nodes. The RF circuitry 1692 communicates bi-directionally with the controller circuit 1690 via a connection 1689 (e.g., communication link, signal line, electrical connection, etc.). The hub 1684 can be a wireless control device 1684 or the controller circuit 1690, RF circuitry 1692, and antenna(s) 1699 in combination may form the wireless control device as discussed herein.

In one embodiment, an apparatus (e.g., hub) for providing a wireless asymmetric network architecture includes a memory for storing instructions, processing logic (e.g., one or more processing units, processing logic 1544, processing logic 1663, processing logic 1688, processing logic 1763, processing logic 1888) of the hub to execute instructions to establish and control communications in a wireless asymmetric network architecture, and radio frequency (RF) circuitry (e.g., RF circuitry 1550, RF circuitry 1670, RF circuitry 1692, RF circuitry 1890) including multiple antennas (e.g., antenna(s) 1552, antenna(s) 1678, antenna(s) 1699, antennas 1311, 1312, and 1313, etc.) to transmit and receive communications in the wireless asymmetric network architecture. The RF circuitry and multiple antennas to transmit communications to a plurality of sensor nodes (e.g., node 1, node 2) each having a wireless device with a transmitter and a receiver (or transmitter and receiver functionality of a transceiver) to enable bi-directional communications with the RF circuitry of the apparatus in the wireless asymmetric network architecture.

In one example, a first wireless node includes a wireless device with one or more processing units and RF circuitry for transmitting and receiving communications in the wireless network architecture including a first RF signal having a first packet. A second wireless node includes a wireless device with a transmitter and a receiver to enable bi-directional communications with the first wireless node in the wireless network architecture including a second RF signal with a second packet. The one or more processing units of the first wireless node are configured to execute instructions to determine a time of flight estimate for localization based on a time estimate of round trip time of the first and second packets and a time estimate of the time of flight that is based on channel sense information of the first and second wireless nodes.

In one example, the apparatus is powered by a mains electrical source and the plurality of sensor nodes are each powered by a battery source to form the wireless network architecture.

Various batteries could be used in the wireless sensor nodes, including lithium-based chemistries such as Lithium Ion, Lithium Polymer, Lithium Phosphate, and other such chemistries as would be apparent to one of ordinary skill in the art. Additional chemistries that could be used include Nickel metal hydride, standard alkaline battery chemistries, Silver Zinc and Zinc Air battery chemistries, standard Carbon Zinc battery chemistries, lead Acid battery chemistries, or any other chemistry as would be obvious to one of ordinary skill in the art.

The present invention also relates to an apparatus for performing the operations described herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method operations.

Figure 15:
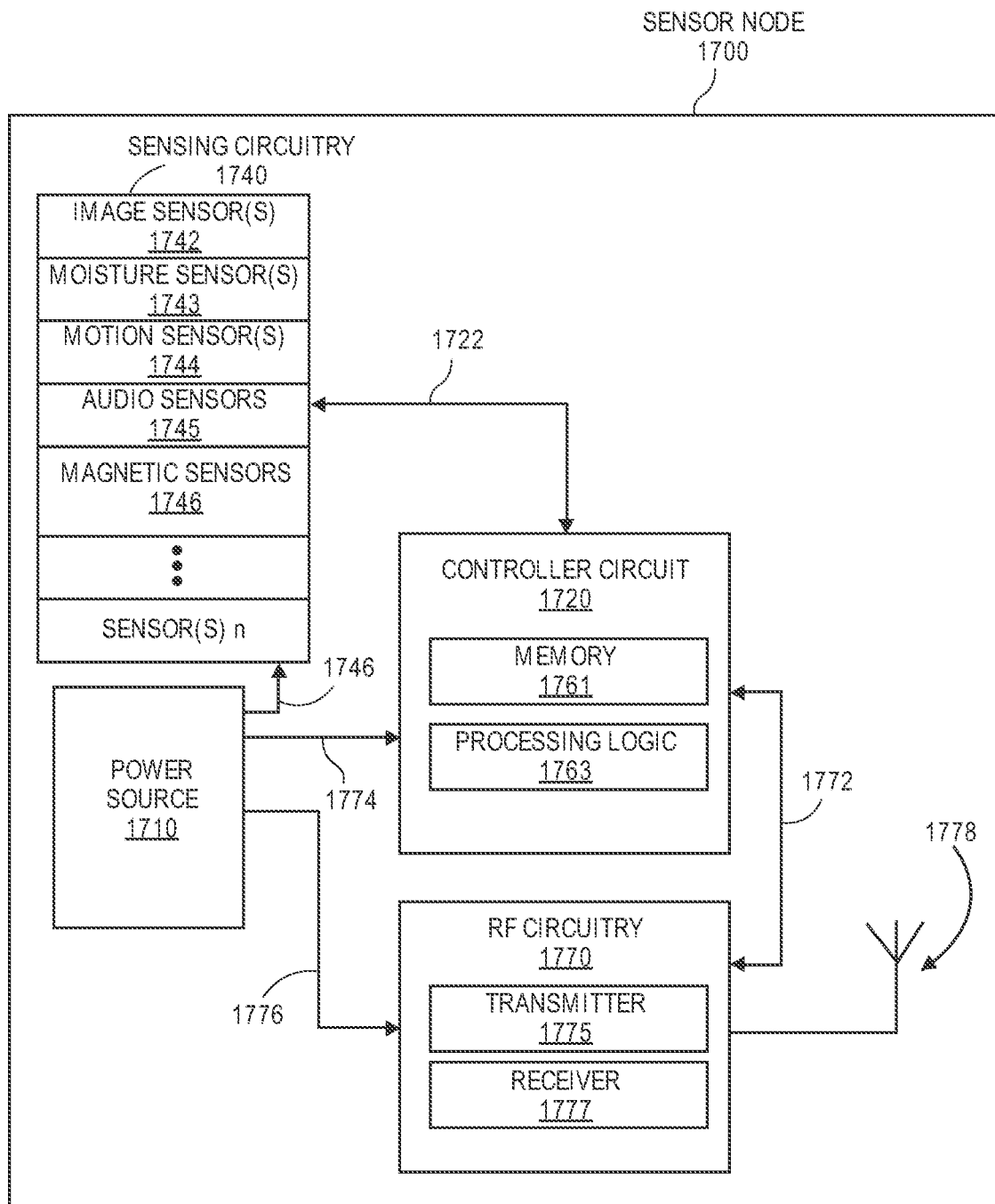
FIG. 15 illustrates a block diagram of a sensor node in accordance with one embodiment.

FIG. 15 illustrates a block diagram of a sensor node in accordance with one embodiment. The sensor node 1700 includes a power source 1710 (e.g., energy source, battery source, primary cell, rechargeable cell, etc.) that provides power (e.g., DC power supply) to a controller circuit 1720 via a connection 1774 (e.g., communication link, signal line, electrical connection, etc.), provides power to RF circuitry 1770 via a connection 1776 (e.g., communication link, signal line, electrical connection, etc.), and provides power to sensing circuitry 1740 via a connection 1746 (e.g., communication link, signal line, electrical connection, etc.). The controller circuit 1720 includes memory 1761 or is coupled to memory that stores instructions which are executed by processing logic 1763 (e.g., one or more processing units) of the controller circuit 1720 for controlling operations of the sensor node for forming and monitoring the wireless asymmetrical network as discussed herein. The RF circuitry 1770 (e.g., communication circuitry) may include a transceiver or separate transmitter 1775 and receiver 1777 functionality for sending and receiving bi-directional communications via antenna(s) 1778 with the hub(s) and optional wireless sensor nodes. The RF circuitry 1770 communicates bi-directionally with the controller circuit 1720 via a connection 1772 (e.g., electrical connection). The sensing circuitry 1740 includes various types of sensing circuitry and sensor(s) including image sensor(s) and circuitry 1742, moisture sensor(s) and circuitry 1743, temperature sensor(s) and circuitry, humidity sensor(s) and circuitry, air quality sensor(s) and circuitry, light sensor(s) and circuitry, motion sensor(s) and circuitry 1744, audio sensor(s) and circuitry 1745, magnetic sensor(s) and circuitry 1746, and sensor(s) and circuitry n, etc.

The wireless localization techniques disclosed herein may be combined with other sensed information to improve localization accuracy of the overall network. For example, in wireless sensors in which one or more of the nodes contain cameras, captured images can be used with image processing and machine learning techniques to determine whether the sensor nodes that are being monitored are looking at the same scene and are therefore likely in the same room. Similar benefits can be achieved by using periodic illumination and photodetectors. By strobing the illumination and detecting using the photodetectors, the presence of an optical path can be detected, likely indicating the absence of opaque walls between the strobe and the detector. In other embodiments, magnetic sensors can be integrated into the sensor nodes and used as a compass to detect the orientation of the sensor node that is being monitored. This information can then be used along with localization information to determine whether the sensor is on the wall, floor, ceiling, or other location.

In one example, each sensor node may include an image sensor and each perimeter wall of a house includes one or more sensor nodes. A hub analyzes sensor data including image data and optionally orientation data along with localization information to determine absolute locations for each sensor node. The hub can then build a three dimensional image of each room of a building for a user. A floor plan can be generated with locations for walls, windows, doors, etc. Image sensors may capture images indicating a change in reflections that can indicate home integrity issues (e.g., water, leaking roof, etc.).

Figure 16:
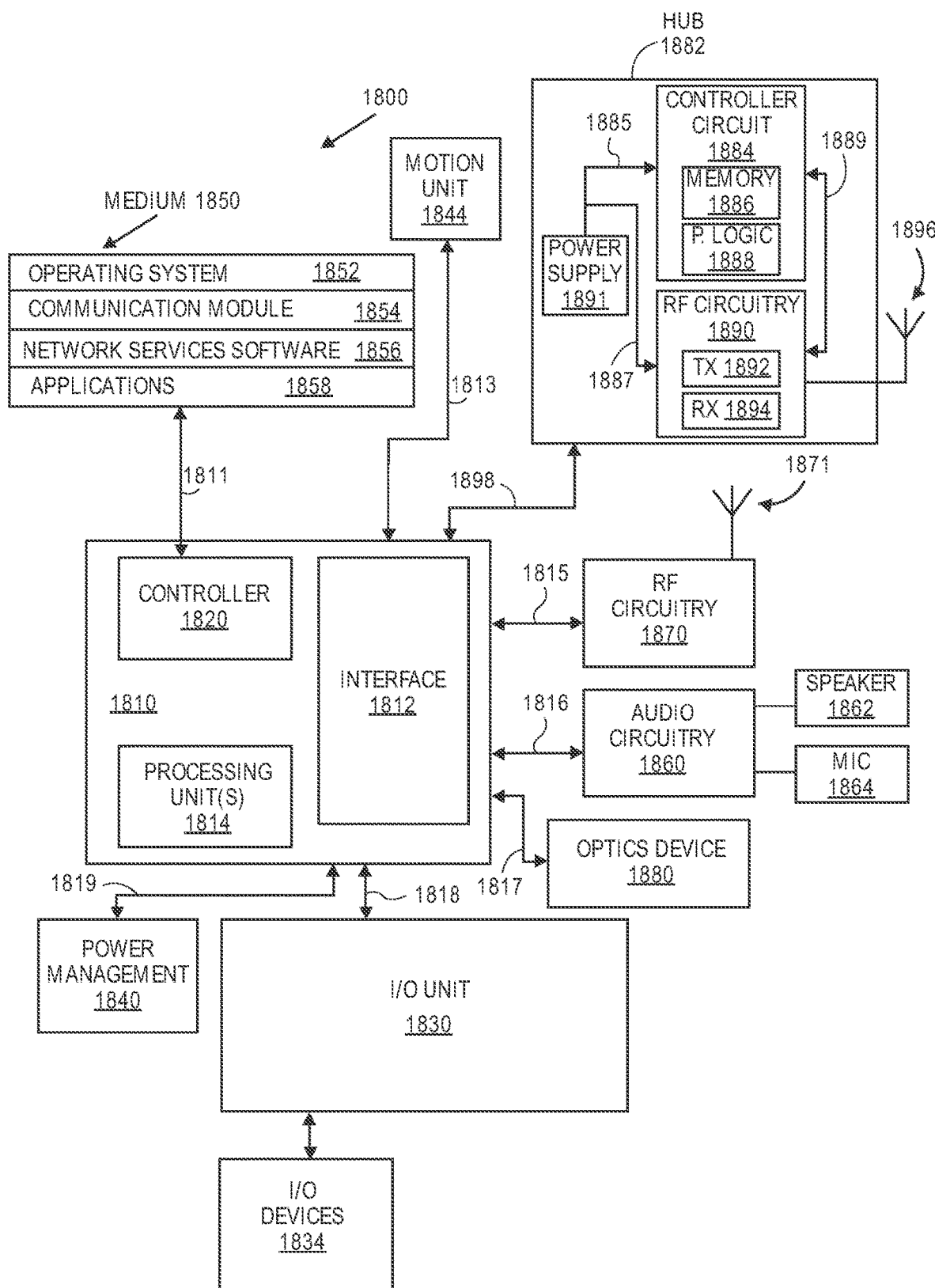
FIG. 16 illustrates a block diagram of a system or appliance 1800 having a hub in accordance with one embodiment.

FIG. 16 illustrates a block diagram of a system 1800 having a hub in accordance with one embodiment. The system 1800 includes or is integrated with a hub 1882 or central hub of a wireless asymmetric network architecture. The system 1800 (e.g., computing device, smart TV, smart appliance, communication system, etc.) may communicate with any type of wireless device (e.g., cellular phone, wireless phone, tablet, computing device, smart TV, smart appliance, etc.) for sending and receiving wireless communications. The system 1800 includes a processing system 1810 that includes a controller 1820 and processing units 1814. The processing system 1810 communicates with the hub 1882, an Input/Output (I/O) unit 1830, radio frequency (RF) circuitry 1870, audio circuitry 1860, an optics device 1880 for capturing one or more images or video, an optional motion unit 1844 (e.g., an accelerometer, gyroscope, etc.) for determining motion data (e.g., in three dimensions) for the system 1800, a power management system 1840, and machine-accessible non-transitory medium 1850 via one or more bi-directional communication links or signal lines 1898, 1818, 1815, 1816, 1817, 1813, 1819, 1811, respectively.

The hub 1882 includes a power supply 1891 that provides power (e.g., DC power supply) to a controller circuit 1884 via a connection 1885 (e.g., communication link, signal line, electrical connection, etc.) and provides power to RF circuitry 1890 via a connection 1887 (e.g., communication link, signal line, electrical connection, etc.). The controller circuit 1884 includes memory 1886 or is coupled to memory that stores instructions which are executed by processing logic 1888 (e.g., one or more processing units) of the controller circuit 1884 for controlling operations of the hub for forming and monitoring the wireless asymmetrical network as discussed herein. The RF circuitry 1890 may include a transceiver or separate transmitter (TX) 1892 and receiver (RX) 1894 functionality for sending and receiving bi-directional communications via antenna(s) 1896 with the wireless sensor nodes or other hubs. The RF circuitry 1890 communicates bi-directionally with the controller circuit 1884 via a connection 1889 (e.g., communication link, signal line, electrical connection, etc.). The hub 1882 can be a wireless control device 1884 or the controller circuit 1884, RF circuitry 1890, and antenna(s) 1896 in combination may form the wireless control device as discussed herein.

RF circuitry 1870 and antenna(s) 1871 of the system or RF circuitry 1890 and antenna(s) 1896 of the hub 1882 are used to send and receive information over a wireless link or network to one or more other wireless devices of the hubs or sensors nodes discussed herein. Audio circuitry 1860 is coupled to audio speaker 1862 and microphone 1064 and includes known circuitry for processing voice signals. One or more processing units 1814 communicate with one or more machine-accessible non-transitory mediums 1850 (e.g., computer-readable medium) via controller 1820. Medium 1850 can be any device or medium (e.g., storage device, storage medium) that can store code and/or data for use by one or more processing units 1814. Medium 1850 can include a memory hierarchy, including but not limited to cache, main memory and secondary memory.

The medium 1850 or memory 1886 stores one or more sets of instructions (or software) embodying any one or more of the methodologies or functions described herein. The software may include an operating system 1852, network services software 1856 for establishing, monitoring, and controlling wireless asymmetric network architectures, communications module 1854, and applications 1858 (e.g., home or building security applications, home or building integrity applications, developer applications, etc.). The software may also reside, completely or at least partially, within the medium 1850, memory 1886, processing logic 1888, or within the processing units 1814 during execution thereof by the device 1800. The components shown in FIG. 18 may be implemented in hardware, software, firmware or any combination thereof, including one or more signal processing and/or application specific integrated circuits.

Communication module 1854 enables communication with other devices. The I/O unit 1830 communicates with different types of input/output (I/O) devices 1834 (e.g., a display, a liquid crystal display (LCD), a plasma display, a cathode ray tube (CRT), touch display device, or touch screen for receiving user input and displaying output, an optional alphanumeric input device).

In one example, an asynchronous system for localization of nodes in a wireless network architecture comprises a first wireless node having a wireless device with one or more processing units and RF circuitry for transmitting and receiving communications in the wireless network architecture including a first RF signal with a first packet and a second wireless node having a wireless device with a transmitter and a receiver to enable bi-directional communications with the first wireless node in the wireless network architecture including a second RF signal with a second packet. The one or more processing units of the first wireless node are configured to execute instructions to determine a coarse time of flight estimate of the first and second packets and a fine time estimate of the time of flight using channel sense information of the first and second wireless nodes.

In another example, the first wireless node has a first reference clock signal and the second wireless node has a second reference clock signal.

In another example, the coarse time of flight estimate of the first and second packets is based on a first time when the first wireless node sends the first packet, a second time when the second wireless node receives the first packet, a third time when the second wireless node sends the second packet, and a fourth time when the first wireless node receives the second packet.

In another example, the channel information of the first wireless node comprises a first measurement of a channel response of the second packet and the channel information of the second wireless device comprises a second measurement of a channel response of the first packet.

In another example, a combined forward channel response for coarse and fine channel estimates comprises applying a clock phase offset as an addition of a linear phase to the second measurement. In another example, a combined reverse channel response for coarse and fine channel estimates comprises applying a clock phase offset as a subtraction of a linear phase to the first measurement.

In another example, at least one of Matrix Pencil and MUSIC algorithms are used to estimate minimum delay of multiple paths from the first measurement of the channel response of the second packet and the second measurement of the channel response of the first packet. In another example, a distance between the first and second wireless nodes is used to determine relative or absolute locations of the first and second wireless nodes based on anchor node based triangulation or anchor node less triangulation.

In another example, the distance between the first and second wireless nodes is used to determined relative or absolute locations of the first and second wireless nodes based on anchor node based triangulation or anchor node less triangulation.

In another example, the distance between the first and second wireless nodes is used to determine localization information which is used to define constellation membership in a wireless sensor network having a plurality of wireless sensor nodes. In another example, a remote device with one or more processing units that are configured to execute instructions to at least partially determine a coarse time of flight estimate of the first and second packets and a fine time estimate of the time of flight using channel information of the first and second wireless nodes.

In one embodiment, a synchronous system for localization of nodes in a wireless network architecture comprises a first wireless node having a wireless device with one or more processing units and RF circuitry for transmitting and receiving communications in the wireless network architecture including a first RF signal having a first packet. A second wireless node includes a wireless device with one or more processing units and RF circuitry to enable bi-directional communications with the first wireless node in the wireless network architecture including a second RF signal having a second packet. The one or more processing units of the first wireless node are configured to execute instructions to determine a coarse time of flight estimate of the first and second packets and a fine time estimate of the time of flight using channel information of the first and second wireless nodes. The first and second wireless nodes have the same reference clock signal.

In one example, the coarse time of flight estimate of the first and second packets is based on a first time when the first wireless node sends the first packet, a second time when the second wireless node receives the first packet, a third time when the second wireless node sends the second packet, and a fourth time when the first wireless node receives the second packet.

The coarse time of flight estimate has a resolution that is limited by a time resolution of a sampling clock, which will have a frequency of $f_s$ for controlling circuitry that detects a timing of a transmission or a reception.

In another example, the channel information of the first wireless node comprises a first measurement of a channel response of the second packet and channel information of the second wireless device comprises a second measurement of a channel response of the first packet.

In another example, a combined channel response for coarse and fine channel estimates comprises applying a coarse delay as an addition of a linear phase shift to the channel response prior to estimating minimum delay of multiple paths between the first and second wireless nodes.

In another example, at least one of Matrix Pencil and MUSIC algorithms are used to estimate minimum delay of multiple paths between the first and second wireless nodes.

In another example, the channel response without the coarse delay is averaged across multiple packets or multiple wireless transmissions to improve signal to noise ratio and thus improve accuracy of path estimation.

In another example, the combined channel response with the coarse delay is averaged across multiple packets or multiple wireless transmissions to improve signal to noise ratio and thus improve accuracy of path estimation.

In one embodiment, an apparatus, comprises a memory for storing instructions, one or more processing units to execute instructions for controlling a plurality of sensor nodes in a wireless network architecture and determining locations of the plurality of sensor nodes, and radio frequency (RF) circuitry to transmit communications to and receive communications from the plurality of sensor nodes each having a wireless device with a transmitter and a receiver to enable bi-directional communications with the RF circuitry of the apparatus in the wireless network architecture. The one or more processing units of the apparatus are configured to execute instructions to transmit a first RF signal having a first packet to a sensor node, to receive a second RF signal with a second packet from the sensor node, and to determine a coarse time of flight estimate of the first and second packets and a fine time estimate of the time of flight using channel information of the first and second wireless nodes.

In one example, the apparatus has a first reference clock signal and the sensor node has a second reference clock signal.

In another example, the coarse time of flight estimate of the first and second packets is based on a first time when the apparatus sends the first packet, a second time when the sensor node receives the first packet, a third time when the sensor node sends the second packet, and a fourth time when the apparatus receives the second packet.

In another example, channel information of the apparatus comprises a first measurement of a channel response of the second packet and channel information of the sensor node comprises a second measurement of a channel response of the first packet.

In one example, a combined channel response comprises multiplying the first measurement and the second measurement to cancel a phase difference between the first and second reference clock signals. The combined channel response is averaged across multiple packets or multiple wireless transmissions to improve signal to noise ratio and thus improve accuracy of path estimation.

In another example, a divided channel response comprises dividing the first measurement by the second measurement to estimate a phase difference between the first and second reference clock signals. The divided channel response is averaged across multiple packets or multiple wireless transmissions to improve signal to noise ratio and thus improve accuracy of path estimation.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of calibrating a time of flight measurement system comprising:
   initiating calibration, with processing logic, of at least one component of RF circuitry having a transmit chain and a receive chain of a first wireless node of the time of flight measurement system by generating a first loopback calibration signal and passing this first loopback calibration signal through the transmit chain and passing this first loopback calibration signal through the receive chain of the first wireless node; and
   measuring a first transmit time delay for passing the first loopback calibration signal through the transmit chain; and
   also measuring a first receive time delay for passing the first loopback calibration signal through the receive chain of the first wireless node, wherein the transmit chain is connected to the receive chain for the calibration.

2. The method of claim 1, further comprising:
   measuring a second transmit time delay for passing a second loopback calibration signal through a transmit chain of a second wireless node of the time of flight measurement system and also measuring a second receive time delay for passing the second loopback calibration signal through the receive chain of the second wireless node.

3. The method of claim 2, further comprising:
   calculating a first time delay of the first loopback calibration signal based on the first transmit time delay and the first receive time delay; and
   calculating a second time delay of the second loopback calibration signal based on the second transmit time delay and the second receive time delay.

4. The method of claim 3, further comprising:
   measuring a round trip time for transmitting a first communication from the first wireless node to the second wireless node and transmitting a second communication from the second wireless node to the first wireless node.

5. The method of claim 4, further comprising:
   correcting the round trip time for transmitting the first and second communications between the first and second wireless nodes based on the first time delay of the first loopback calibration signal and the second time delay of the second loopback calibration signal.

6. The method of claim 5, further comprising:
calibrating the frequency response of the transmit and receive chains for the first wireless node based on a frequency response of the transmit chain and a frequency response of the receive chain for the first wireless node.

7. The method of claim 6, wherein the calibration occurs periodically during normal operation of a wireless network of sensor nodes to allow changes in hardware delays and non-idealities over time and temperature to be calibrated and corrected automatically.

8. An apparatus, comprising:
a memory for storing instructions;
processing logic including circuitry to execute instructions for controlling a plurality of sensor nodes in a wireless network architecture and determining locations of the plurality of sensor nodes; and
radio frequency (RF) circuitry to transmit communications to and receive communications from the plurality of sensor nodes each having RF circuitry to enable bi-directional communications with the RF circuitry of the apparatus in the wireless network architecture, wherein the processing logic of the apparatus is configured to execute instructions to initiate calibration of at least one component of the RF circuitry having a transmit chain and a receive chain of the apparatus of a time of flight measurement system by generating a first loopback calibration signal and passing this first loopback calibration signal through the transmit chain and passing this first loopback calibration signal through the receive chain, wherein the transmit chain is connected to the receive chain for the calibration.

9. The apparatus of claim 8, wherein the processing logic of the apparatus is configured to execute instructions to measure a first transmit time delay for passing the first loopback calibration signal through the transmit chain and also to measure a first receive time delay for passing the first loopback calibration signal through the receive chain of the apparatus.

10. The apparatus of claim 9, wherein the processing logic of the apparatus is configured to execute instructions to measure a second transmit time delay for passing a second loopback calibration signal through a transmit chain of a sensor node and also to measure a second receive time delay for passing the second loopback calibration signal through the receive chain of the sensor node.

11. The apparatus of claim 10, wherein the processing logic of the apparatus is configured to execute instructions to calculate a first time delay of the first loopback calibration signal based on the first transmit time delay and the first receive time delay and to calculate a second time delay of the second loopback calibration signal based on the second transmit time delay and the second receive time delay.

12. The apparatus of claim 11, wherein the processing logic of the apparatus is configured to execute instructions to measure a round trip time for transmitting a first communication from the apparatus to the sensor node and receiving a second communication from the sensor node.

13. The apparatus of claim 12, wherein the processing logic of the apparatus is configured to execute instructions to correct the round trip time for transmitting the first communication from the apparatus to the sensor node and receiving the second communication from the sensor node based on the first time delay of the first loopback calibration signal and the second time delay of the second loopback calibration signal.

14. The apparatus of claim 13, wherein the processing logic of the apparatus is configured to execute instructions to calibrate the frequency response of the transmit and receive chains for the apparatus based on a frequency response of the transmit chain and a frequency response of the receive chain for the apparatus.

15. The apparatus of claim 14, wherein the calibration occurs periodically during normal operation of a wireless network of sensor nodes to allow changes in hardware delays and non-idealities over time and temperature to be calibrated and corrected automatically.

16. A wireless sensor node, comprising:
a memory for storing instructions;
processing logic including circuitry to execute instructions for controlling operations of the wireless sensor node in a wireless network architecture; and
radio frequency (RF) circuitry to transmit communications to and receive communications from other wireless sensor nodes each having RF circuitry to enable bi-directional communications with the RF circuitry of the wireless sensor node, wherein the processing logic of the wireless sensor node is configured to receive instructions for calibration of at least one component of the RF circuitry having a transmit chain and a receive chain of the wireless sensor node of a time of flight measurement system and to generate a first loopback calibration signal and passing this first loopback calibration signal through the transmit chain and passing this first loopback calibration signal through the receive chain of the wireless sensor node, wherein the transmit chain is connected to the receive chain for the calibration.

17. The wireless sensor node of claim 16, wherein the processing logic of the wireless sensor node is configured to execute instructions to measure a first transmit time delay for passing the first loopback calibration signal through the transmit chain and also to measure a first receive time delay for passing the first loopback calibration signal through the receive chain of the wireless sensor node.

18. The wireless sensor node of claim 17, wherein the processing logic of the wireless sensor node is configured to execute instructions to measure a second transmit time delay for passing a second loopback calibration signal through a transmit chain of an additional wireless sensor node and also to measure a second receive time delay for passing the second loopback calibration signal through the receive chain of the additional wireless sensor node.

19. The wireless sensor node of claim 18, wherein the processing logic of the wireless sensor node is configured to execute instructions to calculate a first time delay of the first loopback calibration signal based on the first transmit time delay and the first receive time delay and to calculate a second time delay of the second loopback calibration signal based on the second transmit time delay and the second receive time delay.

20. The wireless sensor node of claim 19, wherein the processing logic of the wireless sensor node is configured to execute instructions to measure a round trip time for transmitting a first communication from the wireless sensor node to an additional wireless sensor node and receiving a second communication from the additional wireless sensor node.

21. The wireless sensor node of claim 20, wherein the processing logic of the wireless sensor node is configured to execute instructions to correct the round trip time based on the first time delay of the first loopback calibration signal and the second time delay of the second loopback calibration signal.

22. The wireless sensor node of claim 16, wherein the processing logic of the wireless sensor node is configured to execute instructions to calibrate the frequency response of the transmit and receive chains for the wireless sensor node.

23. The wireless sensor node of claim 22, wherein the calibration occurs periodically during normal operation of a wireless network of sensor nodes to allow changes in hardware delays and non-idealities over time and temperature to be calibrated and corrected automatically.

24. A system, comprising:
a plurality of wireless sensor nodes in a wireless network architecture;
a hub having processing logic including circuitry to execute instructions for controlling operations of the plurality of wireless sensor nodes in the wireless network architecture and having radio frequency (RF) circuitry to transmit communications to and receive communications from the plurality of wireless sensor nodes, wherein the processing logic is configured to initiate calibration of at least one component of the RF circuitry having a transmit chain and a receive chain of the hub by generating a first loopback calibration signal and passing this first loopback calibration signal through the transmit chain and passing this first loopback calibration signal through the receive chain, wherein the transmit chain is connected to the receive chain for the calibration.

25. The system of claim 24, further comprising:
a remote device that has a different location from the wireless network architecture, wherein the remote device or the hub is configured to execute instructions to measure a first transmit time delay for passing the first loopback calibration signal through the transmit chain and also to measure a first receive time delay for passing the first loopback calibration signal through the receive chain of the hub.

26. The system of claim 25, wherein the remote device or the hub is configured to execute instructions to measure a second transmit time delay for passing a second loopback calibration signal through a transmit chain of a sensor node and also to measure a second receive time delay for passing the second loopback calibration signal through the receive chain of the sensor node.

* * * * *